United States Patent [19]
Chan et al.

[11] Patent Number: 5,991,546
[45] Date of Patent: Nov. 23, 1999

[54] SYSTEM AND METHOD FOR INTERFACING MANUALLY CONTROLLABLE INPUT DEVICES TO A UNIVERSAL COMPUTER BUS SYSTEM

[75] Inventors: Teh-Hsin Philip Chan; Mike Ching-Hsing Chen; Arthur Kent Hargrove, all of Irvine; Scot Chuen Leung Hui, West Covina; Jason Jzhong Lee, La Habra; Brian Chien Hun Lin, Laguna Niguel; Sam Chien-Shin Lin, Rancho Santa Margarita; Raymond Cheng-Yu Liu, Laguna Niguel; Victor Moon-Fai Siu, Huntington Beach; Sam An Wong, Orange, all of Calif.

[73] Assignee: CMD Technology, Inc., Irvine, Calif.

[21] Appl. No.: 08/906,775

[22] Filed: Aug. 29, 1997

Related U.S. Application Data
[60] Provisional application No. 60/026,224, Sep. 17, 1996.

[51] Int. Cl.⁶ .................................................. G06F 13/00
[52] U.S. Cl. .................... 395/882; 395/892; 395/825; 395/309; 395/500
[58] Field of Search ................................... 395/821–839, 395/882–892, 309–312, 500

[56] References Cited

U.S. PATENT DOCUMENTS

| | | | |
|---|---|---|---|
| 4,972,470 | 11/1990 | Farago | 380/3 |
| 5,056,001 | 10/1991 | Sexton | 395/830 |
| 5,214,785 | 5/1993 | Fairweather | 395/800 |
| 5,379,382 | 1/1995 | Work et al. | 395/883 |
| 5,428,748 | 6/1995 | Davidson et al. | 395/829 |
| 5,537,607 | 7/1996 | Ploger, III | 395/830 |
| 5,537,646 | 7/1996 | Buck et al. | 395/500 |
| 5,561,826 | 10/1996 | Davies et al. | 395/891 |
| 5,581,741 | 12/1996 | Clark et al. | 395/500 |
| 5,615,344 | 3/1997 | Corder | 395/309 |
| 5,621,901 | 4/1997 | Morriss et al. | 395/306 |
| 5,671,355 | 9/1997 | Collins | 395/200.2 |
| 5,713,009 | 1/1998 | DeRosa, Jr. et al. | 395/500 |
| 5,717,950 | 2/1998 | Yamaguchi et al. | 395/828 |
| 5,751,975 | 5/1998 | Gillespie et al. | 395/306 |
| 5,793,979 | 8/1998 | Lichtman et al. | 395/200.56 |
| 5,802,318 | 9/1998 | Murray et al. | 395/280 |

*Primary Examiner*—Christopher B. Shin
*Attorney, Agent, or Firm*—Merchant, Gould, Smith, Edell, Welter & Schmidt

[57] ABSTRACT

A system and method for interfacing peripheral devices to a computer universal serial bus is disclosed. The system is adaptable to a wide variety of peripheral devices and features a user-configurable serial EEPROM coupled to the interface in which vendor specific data can be stored for use by the interface. Interface parameters may also be selected by an externally controllable configuration switch.

45 Claims, 16 Drawing Sheets

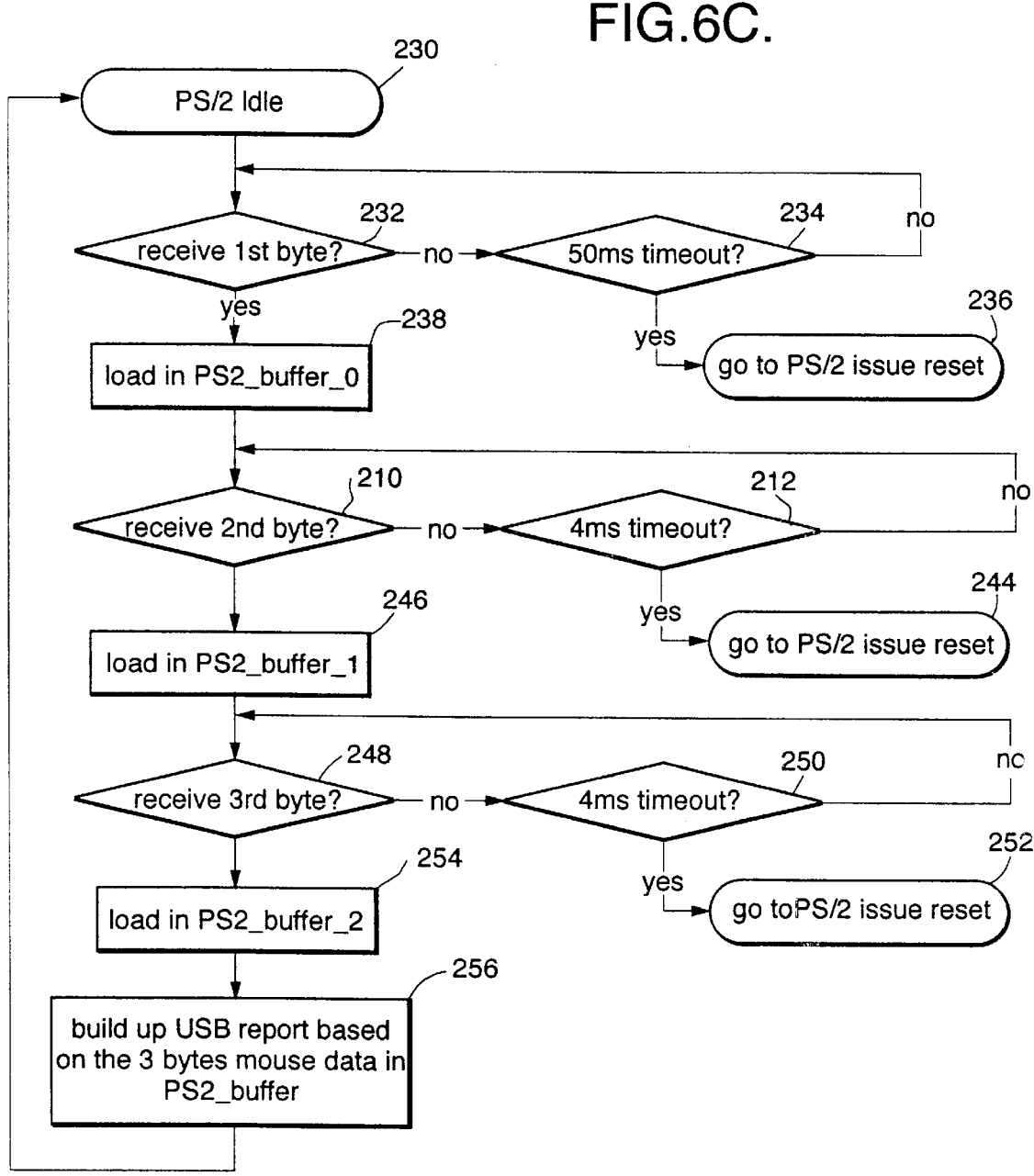

SYSTEM AND METHOD FOR INTERFACING MANUALLY CONTROLLABLE INPUT DEVICES TO A UNIVERSAL COMPUTER BUS SYSTEM

CROSS-REFERENCE TO RELATED APPLICATIONS

This application claims the benefit under 35 U.S.C. §119 (e) of U.S. Provisional application Ser. No. 60/026,224, filed Sep. 17, 1996 for a "SYSTEM AND METHOD OF INTERFACING MANUALLY CONTROLLABLE INPUT DEVICES TO A UNIVERSAL COMPUTER BUS SYSTEM" by Teh-Hsin P. Chan, Mike Ching-Hsing Chen, Arthur K. Hargrove, Scot C. L. Hui, Jason J. Lee, Brian C. H. Lin, Sam Chien-Shin Lin, Raymond Cheng-Yu Liu, Victor Moon-Fai Siu, and Sam A. Wong, which application is also hereby incorporated by reference.

BACKGROUND OF THE INVENTION

1. Field of the Invention

This invention relates to the transfer of input data from manually controlled devices to computer systems, and more particularly to systems and methods for inexpensively and adaptively interfacing between one or more types and configurations of input devices and a host via the Universal Serial Bus ("USB") structure and protocol.

2. Background of the Prior Art

In the earliest versions of computer architecture, a computer or other central processor was connected to operate with one or a number of input, output, and storage devices, each operating in accordance with its own peripheral unit properties and specifications, including data rate, data format and prescriptors, directionality, operating mode, interchange protocols and synchronicity. Since these systems were unitary in the sense that each computer with its associated peripherals stood alone, each peripheral was typically interconnected by an interface section. The circuits and software in the computer controlled data transfer, usually employing buffers. The overhead involved in coaction with the peripherals was a substantial but usually separate burden on the computer system.

With the advent of the microprocessor, a more direct link could be established with some peripherals, because the microprocessor speed and often limited functions enabled it to be used to share some peripheral functions, whether input or output, as by sensing the keys actuated on a keyboard, and refreshing the display on a video screen. The peripherals, however, often had to be specially made or adapted for operation with the microprocessors. Different microprocessors and software approaches limited the interchangeability of peripherals and often required the use of special adapters and installation procedures.

In the same era, communication systems were being expanded to function with different input and output units, including facsimile machines, keyboards and the like. Telephonic digital communications principally involved the use of modems during line transmission and reception, so that further hardware or software came into use in order for these functions to become interactive with personal computers.

There is now a vast inventory of synchronously and asynchronously operable peripherals and PC configurations, mass manufactured for the consumer market. There are also an increasing number of wired and wireless communications systems and devices, many with adjustable human input devices. Low cost peripheral devices, such as keyboards, mouse devices, joy sticks, and touch screens, should be usable for both types of applications in the current and developing state of the art.

Recognizing the need for a universal methodology upon which systems and peripherals can be built, a number of large organizations in the industry devised and accepted a standardized format known as the Universal Serial Bus ("USB"). This is based upon a particular architecture and protocol defined in a specification published as Specification Version 1.0 on Jan. 15, 1996 by Compaq, DEC, IBM, Intel, Microsoft, and Northern Telecom. The USB enables "plug and play" attachment of one or a number of "devices" (which can be a single hardware component or a collection of hardware components, a defined function or a hub) for flow of communication between a source and a sink of information. Different speeds and bandwidths can be accommodated and control information, error correction information, and data transfer blocks are included and defined. Thus, with host computer systems arranged to connect and function with prescribed connections and formats, system and device designers can address a wider market for hardware, including both PC and communication technologies. With this standardized but highly versatile context, PC configurations can be changed and upgraded without requiring corresponding and resultant changes in communication links, software, or I/O devices. The USB overcomes the burdens imposed by disparities of speed and data rates, and provides a low cost, bidirectional low-to-mid speed interconnect that is useful with a wide range of PC architectures. It enables devices and ports to be added with the desired "plug and play" ease.

In the USB approach, many human input devices are essentially passive, and must operate within the power limitations of the bus, and respond to requests for current data. While this simplifies engineering design in many respects, much more is involved if mass produced human input devices are to be attached inexpensively. For example, keyboard, mouse, and joystick devices will vary as to the number, arrangement, and designation of actuator elements. Even from the same vendor, one keyboard matrix may be different from others to meet specific needs. Human input devices may be asynchronous, such as a keyboard, or synchronous, such as a PS/2 mouse. In addition, since programs inherently call for the key combinations, generation of meaningful data for transmission to a processor can require processing to determine the command selected by the operator. It is particularly advantageous to provide a unit which can perform legacy support allowing existing keyboard and PS/2 mouse combinations to operate within the emerging USB interface construct.

It is desirable to provide a unit which can collect data from one or more human input devices of a number of different types with minimal modification to account for variables, so as to make it possible to achieve economies of scale. The variety of input devices, and input device types, and the specific demands imposed by the USB, however, present formidable barriers to achieving a low cost system which is capable of accommodating the different variations used by peripheral device manufacturers, while functioning in the USB system.

SUMMARY OF THE INVENTION

Systems and methods in accordance with the invention overcome the enumerated problems and satisfy the objectives by providing a low-cost, highly adaptable, interface which couples any of a number of different keyboards and other devices to a Universal Serial Bus (USB), including those which comply with the USB protocol (USB-compliant) and those which do not comply (USB-incompliant). The interface includes a degree of processing capability, in conjunction with power management, buffering, clocking, and other resources adjustable to the particular input devices. Based upon this common interface a peripheral or computer manufacturer can mass produce or utilize any of a number of human input device configurations with assurance that the same low cost interface will enable the devices to function in the USB environment. In one example, an internal processor is coupled to a serial EEPROM or other non-volatile memory, to a keyboard engine including a scanner, and to a mouse engine, with the matrix of an external keyboard being interconnected to the terminals of the scanner and the mouse engine being coupled to an external mouse device, which may be of the synchronous PS/2 type. Although the keyboard and mouse have significantly different operative characteristics, the data from both is requested under USB control, verified, buffered, and transferred, with device characteristics being taken into account in building the message frame sequences called for by the USB. To this end, the EEPROM is written for the particular input devices so as to incorporate configuration, vendor, and mapping sequences which enable the processor to operate rapidly to map one or more actuated keys to a data output representing the operator's command. The serial EEPROM also operates to exchange information from the peripheral device to the host with a unique handshake protocol which prevents conflicts when accessing the EEPROM. After verification that neither mechanical nor logical error has occurred, a message is made available for transmission. A synchronous mouse device, internally clocked, provides control button actuation and XY position outputs serially on request. The serial data is converted to parallel in the interface, verified using EEPROM data, assembled into one or more message segments, and thereafter transmitted in the USB format. Provision is included for suspending operation to conserve power, in the event of inactivity for a specified time, for shutting power off to the peripheral devices in the event of demand beyond the USB specifications, and for arbitration of access to the system and correction of errors by the use of interrupts and resets.

A novel system for deriving reliable information as to the operation of the keyboard, while accommodating different keyboard configurations, is provided by a keyboard scanning system in which a matrix of key positions is scanned along successive rows by energizing pulses. Within each pulse, the positions of the columns are successively scanned, to determine the intersection or intersections at which keys are actuated. These results are entered in a register, and the matrix is quickly rescanned, within a variably controllable time determined for that particular unit. The results of the scans are used to assure that key vibration or bounce has not given an erroneous indication, and to ascertain whether a "ghost key" has been sensed. The serial EEPROM is accessed to map the sensed key locations for one or more keys into the value that is to be transmitted to the USB.

The system is advantageously organized in the processor and engine configuration so that low cost standard and ASIC circuit units may be employed. It accepts the intermittent and relatively low and medium speed inputs from the operator-controlled devices and meets all the USB requirements for identification, error detection and correction, hand shaking, and message transfer. Thus, it is fully consistent with the objectives of the USB in terms of low cost, expandability and achieving true plug and play capability.

BRIEF DESCRIPTION OF THE DRAWINGS

A better understanding of the invention may be had by reference to the following description, taken in conjunction with the accompanying drawings, in which:

FIGS. 6A–6C are flowcharts showing operations performed by the present invention to support a keyboard device and a PS/2 device, such as a mouse;

DETAILED DESCRIPTION OF THE INVENTION

Figure 1:
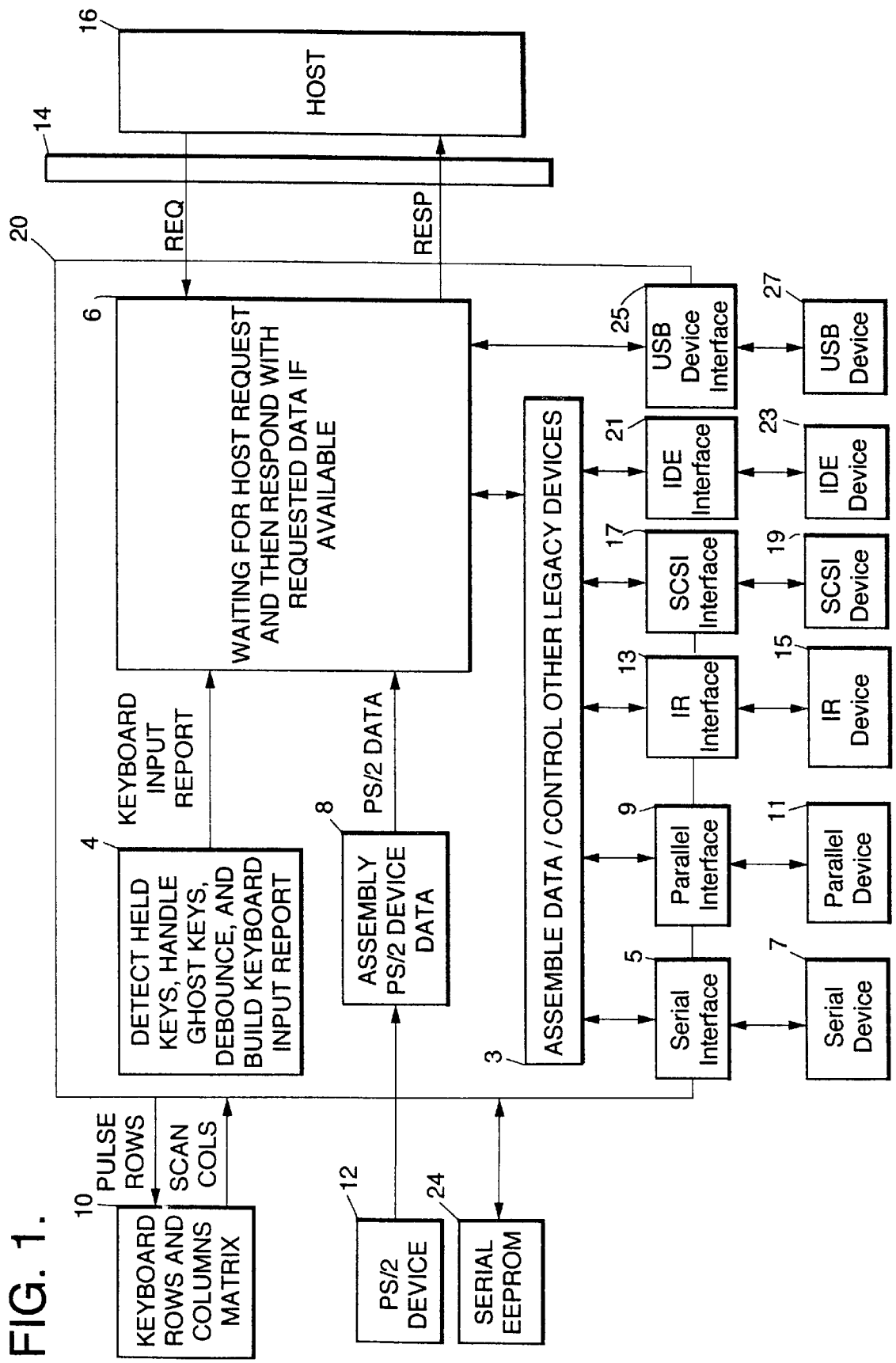
FIG. 1 is a functional block diagram of the present invention.

The examples depicted in FIGS. 1–11 are illustrative only, because the concepts, features, and techniques of the invention can be employed, in whole or in part, in many different combinations. Referring to FIG. 1, the specific exemplification shown is for interfacing a computer keyboard 10 and a mouse device 12 with a Universal Serial Bus (USB) 14 for communication with a host 16. The keyboard 10 may be any of a wide variety of conventional units available from various vendors, having keys arranged generally in rows (here taken in the vertical direction) and columns (here taken in the horizontal direction), so as to be definable in a matrix that can vary in both directions. Some keyboards, for example, define a 8×16 or 8×17 matrix, some may have 8×18, and in some cases a given column (e.g. 17) is not used. The keys, used singly or in combination, define the command or input desired by the operator, and this translation also is not uniform.

The mouse device 12 in this example is a synchronous PS/2 device of conventional form, having two control buttons, X, Y incrementor outputs representing mouse movement, and its own internally clocked microprocessor. The mouse device 12 provides a serial output containing the information generated by operator control and movement. The USB 14 is shown only generally, as is the host 16, since it is not necessary to consider all the implications of processor, network, and interconnection possibilities possible with the USB 14, some of which are set out in the Specifications, Version 1.0. For most uses, however, the host 16 can be expected to be a personal computer (PC).

An data management unit or interface 20 in accordance with the invention couples the host 16 to the peripheral devices 10 and 12. The interface 20 is a control endpoint of a logical USB device, which device also comprises two interrupt endpoints, one each for the keyboard 10 and a PS/2 device 12 such as mouse, joystick, or keypad. Thus, the keyboard 10 and the PS/2 device 12 are passive in the sense that their states are provided only in response to USB 14 requests.

A keyboard-processing capability 4 defines a legacy device interface module and supports the keyboard interrupt endpoint by pulsing the rows of the keyboard 10 and scanning the columns of the keyboard 10 to detect held keys. While detecting held keys, the keyboard-processing capability 4 eliminates "ghost key" indications and performs debouncing functions. The interface 20 repeatedly performs these detection, "ghost key", and debouncing functions at a configurable rate specified in an electrically-changeable data adaptation unit such as the illustrated serial EEPROM 24. Subsequent to successfully debouncing a combination of detected keys, the keyboard-processing capability 4 maps the vendor-specific keycodes of the detected keys to their corresponding Human Input Device (HID) values, which are USB-standardized keycodes, using vendor-supplied tables stored in the serial EEPROM 24. In turn, the keyboard-processing capability 4 builds a Keyboard Input Report consisting of the HID values and formatted according to USB descriptor information obtained from the serial EEPROM 24. PS/2 device processing capability 8 supports the interrupt endpoint by collecting data from the PS/2 device 12, processing this data, and making the data available to the host processing capability 6, which defines a host interface module. Similarly, where the PS/2 device requires or supports bidirectional communications or commands, the PS/2 device processing capability 8 processes data from the host 16 and makes it available to the PS/2 device 12. The translation of data and communication protocols in either direction is accomplished as determined in data stored in the configuration table in the serial EEPROM 24.

Host processing capability 6 manages data flow in interface 20. In parallel with the keyboard-processing capability 4, a host-processing capability 6 waits for device data requests from the host, and upon receipt of a request, determines whether the request is made to the keyboard endpoint or mouse endpoint. If the request is for data from the keyboard endpoint, the host-processing capability 6 responds to the host 16 with any device reports (such as keyboard input reports or PS/2 device reports) that are available. If the request is for data from the mouse endpoint, the host-processing capability 6 responds to the host 16 with any mouse data which a mouse-processing capability 8 has assembled. If an old device report cannot be sent to the host fast enough, the host processing capability 6 accumulates the old report in a new report before transmitting the new report to the host.

In concert with legacy device processing capability 3, the host processing capability 6 also controls and assembles data from other I/O devices, and provides legacy support to interface with devices compliant with a wide variety of interface protocols, including one or more serial devices 7 (such as a mouse, joystick, or keypad), parallel devices 11 (such as modems, digital cameras, and printers), infra-red interface devices 15 (such as printers, digital cameras, cellular phones, and pagers), SCSI devices 17 (such as CD-ROMs, disk drives, printers, and tape drives) and IDE devices 23 such as CD-ROMs and disk drives. In addition, using the reporting capabilities in the USB interface, the present invention can also notify the host 16 when USB-incompliant devices are coupled to the interface 20.

Figure 2:
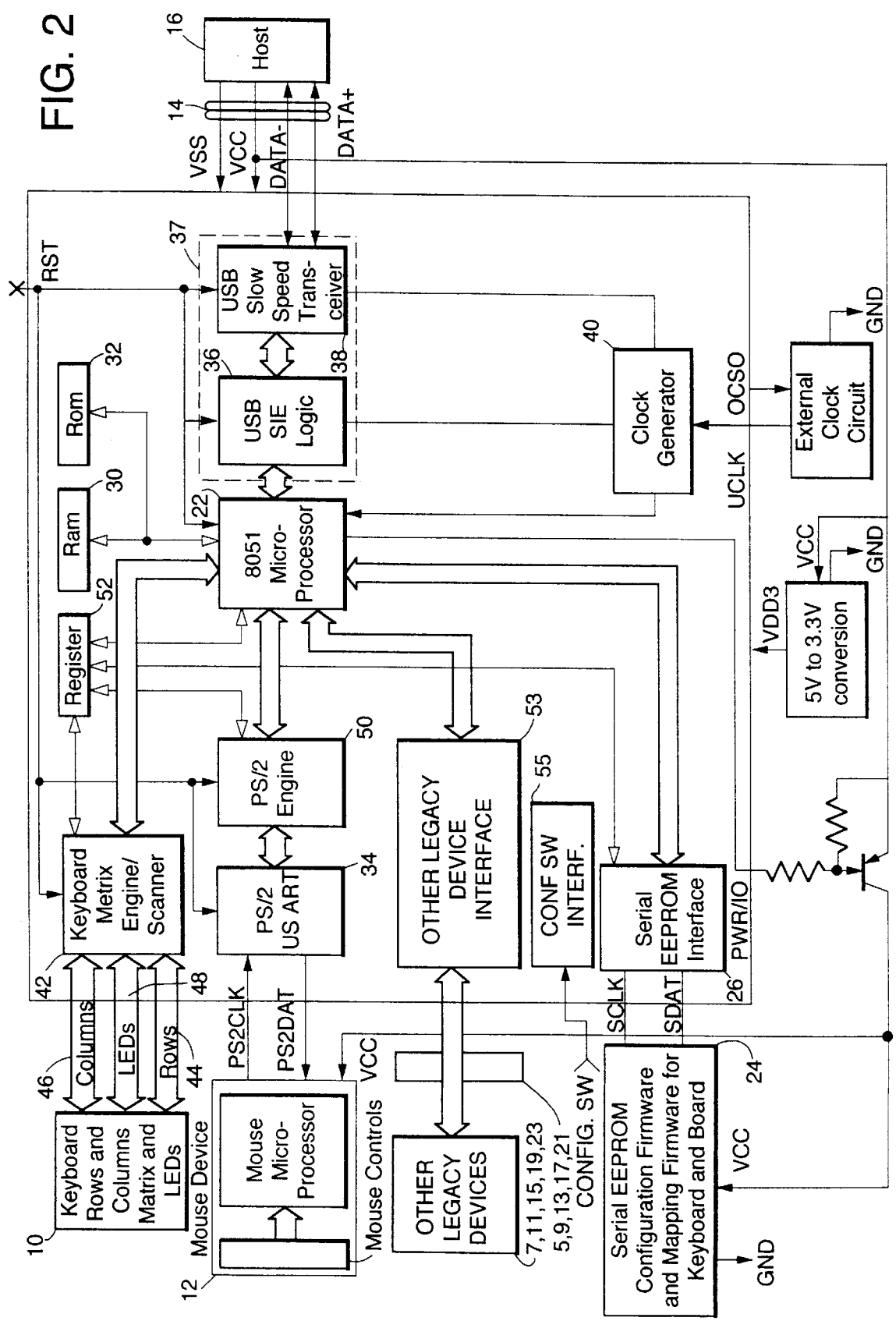
FIG. 2 is a hardware block diagram of the present invention.

FIG. 2 presents a hardware block diagram of the interface 20. Within the interface 20 processing functions are acceptably performed by an 8051 core 22, a widely-used 8-bit microprocessor. Processing functions can also be performed by a specific-design design RISC chip processor, and can be internal or external to the interface 20. The microprocessor 22 capability is augmented by data storage circuits including registers 52, a 256 byte RAM 30, and a 4K ROM 32, employed in buffering, processing, and transferring data as described below. In one embodiment of the present invention, the microprocessor 22 is internally clocked.

Several conventional circuit elements that need not be described in detail are incorporated in the interface 20. These include a PS/2 Universal Synchronous/Asynchronous Receiver Transmitter (USART) 34, for serial to parallel conversion of signals from the mouse device 12, for buffering, and for parallel to serial conversion of signals to the mouse device 12. They also include a assembler circuits 37 comprising a Serial Interface Engine (SIE) logic circuit 36 for communicating identification, synchronization, handshake, and configuration data with the USB 14 via a USB slow speed transceiver 38. In the illustrated embodiment, a internal clock generator 40 is used in synchronizing the microprocessor 22, SIE logic circuit 36, and USB slow-speed transceiver 38.

The interface 20 also comprises a keyboard matrix engine 42 or keyboard scanner which provides the interconnection between the keyboard 10 and the interface 20 through row lines 44, column lines 46, and light emitting diode (LED) lines 48. In addition, the interface 20 incorporates a PS/2 engine 50, through which the 8051 core 22 communicates with the PS/2 USART 34, and a serial EEPROM interface 26, through which the 8051 core 22 communicates with the serial EEPROM 24. EEPROM 24 stores one or more parameter sets with configuration information and interface parameters such as the keyboard scan rate, keyboard debounce count, key code maps (which may be vendor-specific), vendor ID or parameters, default values for parameter sets or other data, and other information. Nominally, this information is stored in a configuration table, and is user-configurable. Under selectable command of one or more configuration switches via a configuration switch interface 55, the configuration table may be programmed into and read from ROM 32 in addition to or as an alternative to the EEPROM 24. Keyboard matrix engine 42 and processor 22 also supports a remote wake-up feature whereby the keyboard 10 is activated when user input, such as a key depression, is sensed.

Serial EEPROM interface 26 is a synchronous data engine which captures digital data into 8-bit data bytes that for processing by the 8051 core 22. The serial EEPROM interface 26 shifts in data from data line SDAT using serial EEPROM clock reference (SCLK). The serial EEPROM interface 26 can operate in a transmit only mode or a bi-directional mode. The SCLK signal is the clock input for the bi-directional mode, and is used to synchronize data transfer to and from the serial EEPROM 24. SCLK must remain in a logical high state for serial EEPROM 24 to continue operations in the transmit only mode. SDAT is used to transfer addresses and data into and out of the serial EEPROM 24 when in the bidirectional mode.

Figure 3:
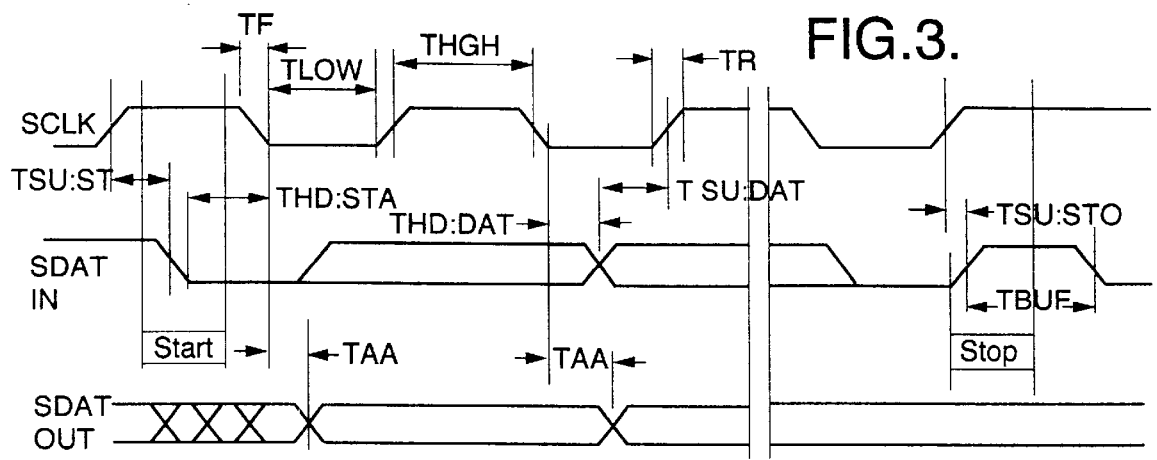
FIG. 3 is an illustration of the data transfer timing with the serial EEPROM of the preset invention.
Figure 4A:
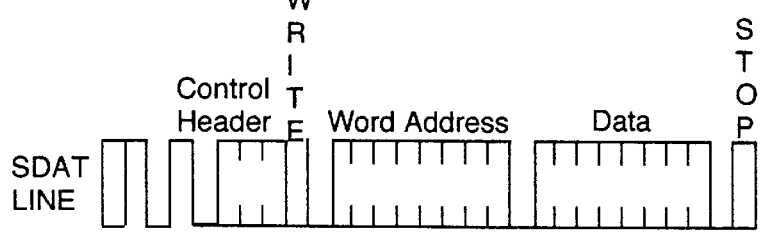
FIG. 4A through 4D are data diagrams showing data transfer modes of the present invention.
Figure 4B:
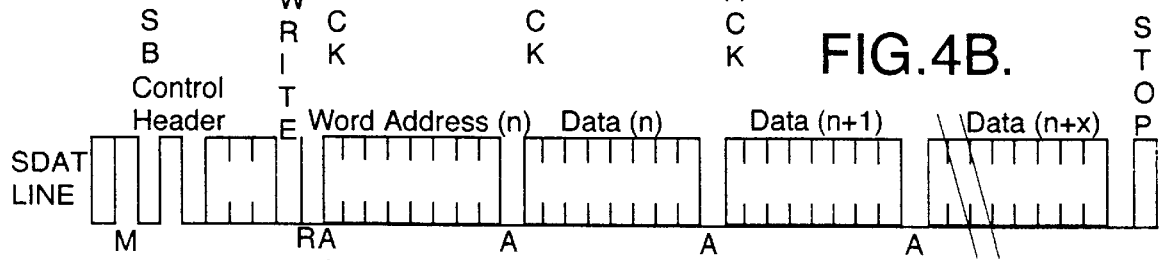
Figure 4C:
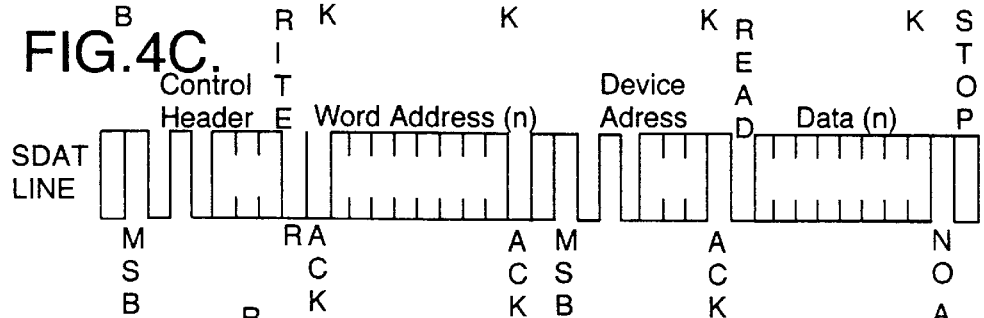
Figure 4D:
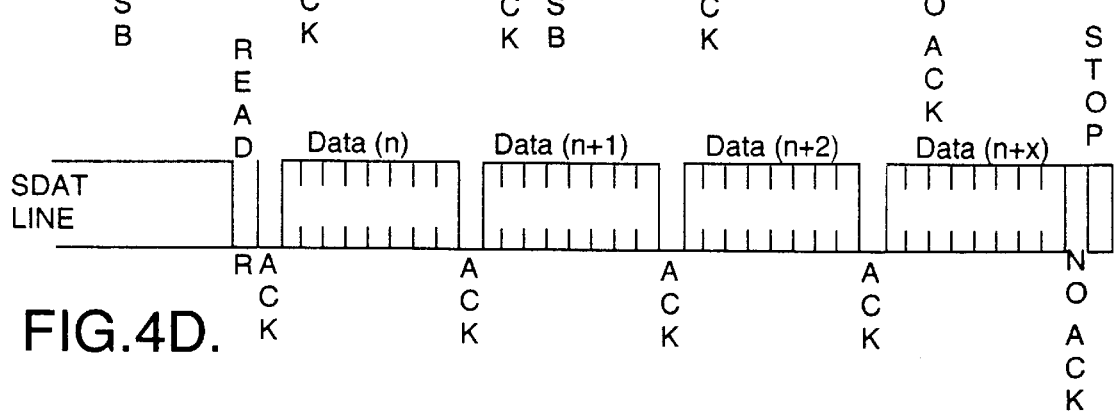

FIG. 3 illustrates data transfer in the bidirectional mode for the serial EEPROM interface 26. Logical state changes in SDAT when the SCLK signal is logically high are reserved for data START and data STOP indication, which indicate the beginning and end of a data package. SCLK is set logically low when data (in the form of logical state transitions) is transferred along data line SDAT. Timing and definitions for the parameters shown in FIG. 3 are described in Table 1.

The serial EEPROM 24 supports four data transfer modes: byte write, page write, random read, and sequential read. Each of these data transfer modes begins with a data START indication, and ends with a data STOP indication. Each data transfer also comprises a control header, word address segment, and following each 8 bits of transmitted data, an acknowledge indication. These data transfer modes are illustrated in FIGS. 4A–D.

Registers 52 serve as the medium for communication of control, status, and data information between the 8051 core 22 and the keyboard matrix engine 22, PS/2 engine 50, and serial EEPROM interface 26. Although the interface 20 monitors the keyboard 10 and mouse 12 for data independently of control from the host 16, the interface 20 manipulates the LED lines 48 in direct response to commands it receives across the USB 14 from the host 16.

Figure 5:
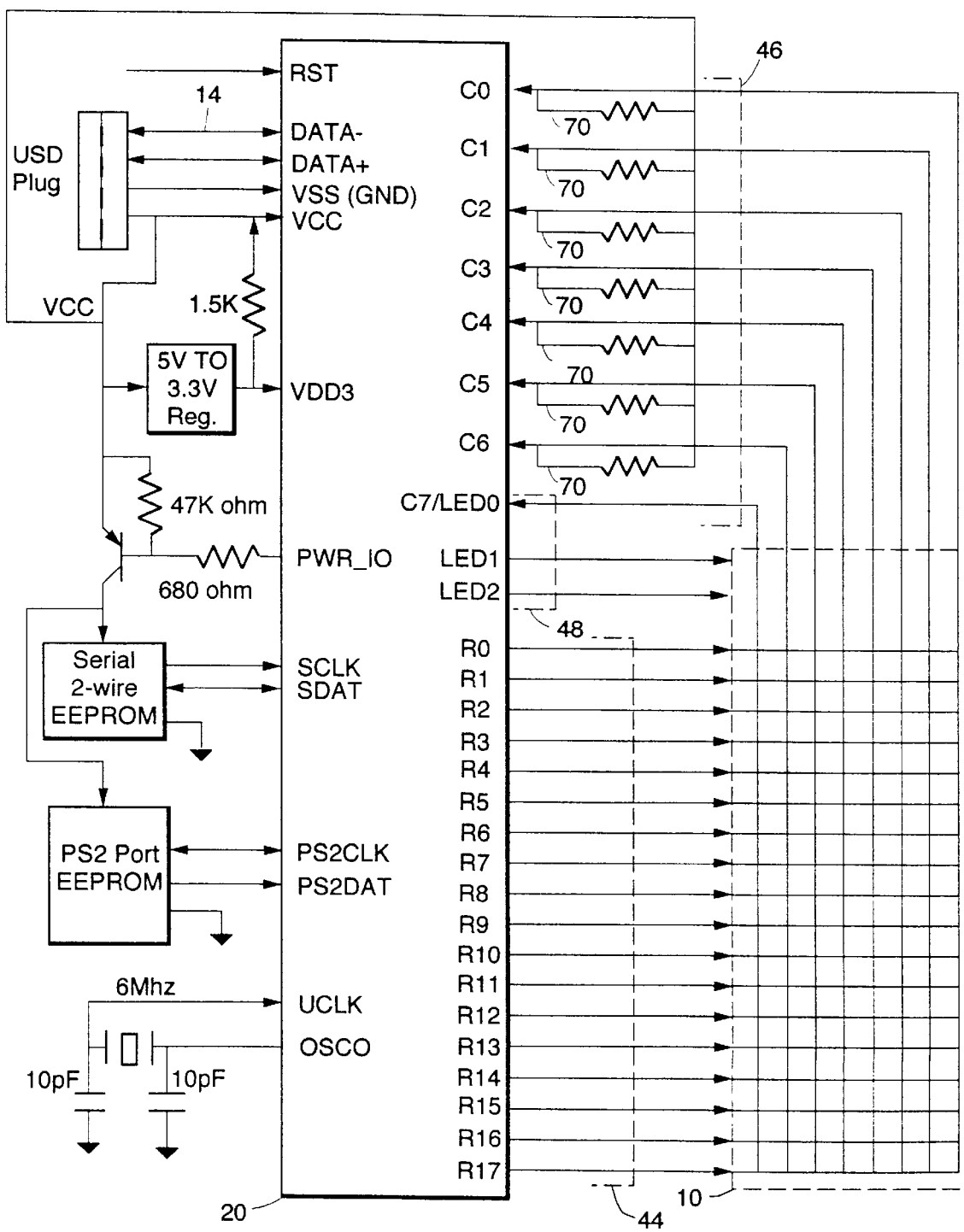
FIG. 5 is a block diagram illustrating a specific embodiment of the interface between a keyboard and the present invention.

FIG. 5 illustrates one example of the coupling between the interface 20 and the keyboard 10. The row lines 44 and LED lines 48 are outputs from the interface 20 that attach directly to the keyboard 10. Eighteen row lines 44 are provided, labeled in ascending order from R0 to R17 and representing rows 0 to 17, respectively, of the keyboard 10. In contrast to the row lines 44 and LED lines 48, the column lines 46 are inputs to the interface 20 that are each connected in parallel with one of the pull-up resistors 70 that are tied to $V_{CC}$ of the Universal Serial Bus 14.

A held key on the keyboard 10 causes a connection to be made between a unique combination of one of the row lines 44 and one of the column lines 46. Upon command from the 8051 core 22, the keyboard matrix engine 42 sequentially pulses the row lines 44 in ascending order while simultaneously scanning the column lines 46 for each of the row lines 44 that is pulsed. If the keyboard matrix engine 42 detects any held keys for one of the row lines 44, it stops pulsing the row lines 44 and notifies the 8051 core 22 through the registers 52 that scanning has been completed. In addition, the keyboard matrix engine 42 records in one of the registers 52 the row number of the last of the row lines 44 to be pulsed as well as sets a bit in another of the registers 52 for each of the column lines 46 that were activated for the last of the row lines 44 to be pulsed. If the keyboard matrix engine 42 does not detect any held keys for any of the pulsed row lines 44, the keyboard matrix engine 42 records a value of 18 in the one of the registers 52 whose value represents the last of the row lines 44 to be pulsed. Every time that the 8051 core 22 signals the keyboard matrix engine 42 to scan the keyboard, the keyboard matrix engine 42 begins pulsing with the next of the row lines 44 in ascending order that follows the last of the row lines 44 to be pulsed. If the row corresponding to the last of the row lines 44 to be pulsed is indicated as row 18, the keyboard matrix engine 42 begins pulsing with R0.

Scanning the column lines 46 can result in indications that keys are held when in fact the keys are not held. These "ghost key" conditions arise when three or more keys are held at the same time in a certain pattern on the keyboard 10. If two keys are held in the same row, a third key is held in the same column as one of the first two keys, and the third key is held in a differently numbered row than the first two keys, the connections that the first two keys make will provide two paths for a pulse generated on the row line corresponding to the row in which the third key is located. One of the two paths correctly indicates that the third key is held. The other path incorrectly indicates that a fourth key is held in the same row as the third key and the same column as the other of first two keys that is not in the same column as the third key.

The flowchart depicted in FIG. 6 presents an overview of the operations performed by the present invention. These operations are performed by the firmware of the 8051 core 22. After power-on, a self-test is run on the ASIC circuit units implementing the present invention. As depicted, in block 80, the system next determines whether the ASIC self-test successfully completed and whether a fault was detected. If the ASIC self-test did not complete successfully or a fault was detected, firmware operations are halted with an unrecoverable error, as depicted in block 82. Otherwise, block 84 initializes hardware interfaces and firmware attributes.

Figure 6A:
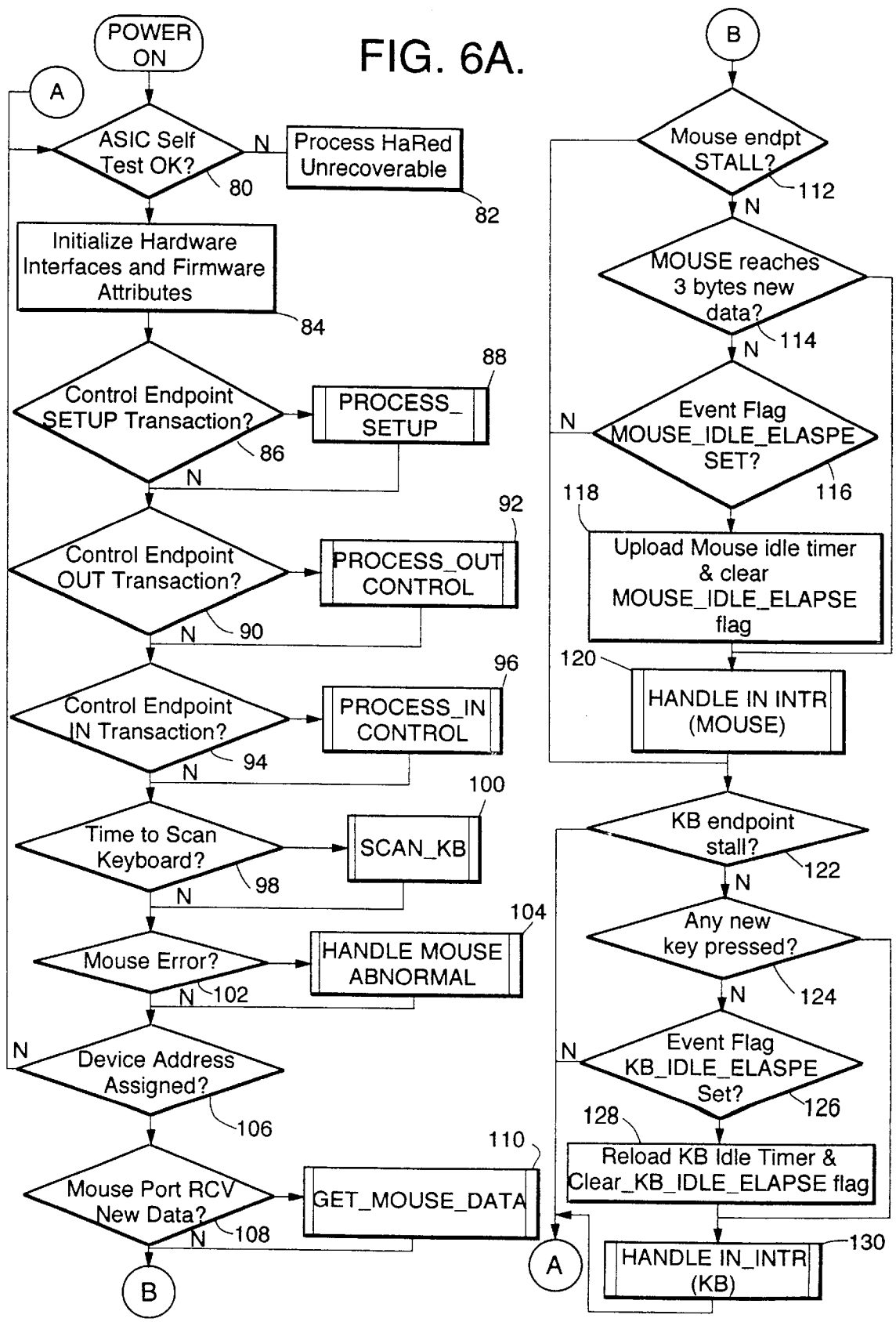
Figure 6B:
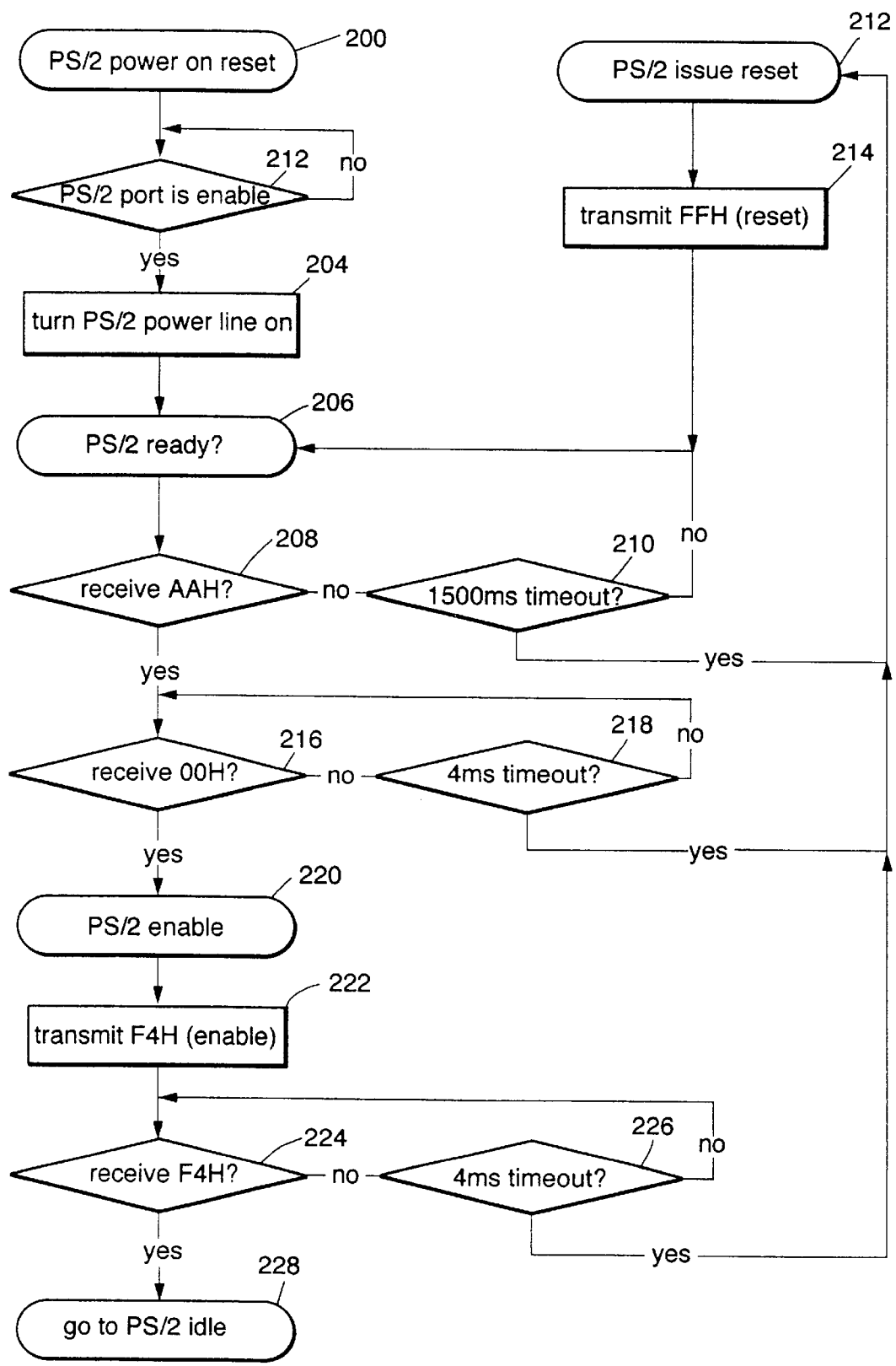

For purposes of illustration, FIG. 6B is a flow chart showing the initialization operations performed for a PS/2 compliant device such as a mouse. First, the PS/2 device receives 200 a power on and reset when powered on. If the PS/2 port is enabled 202, the PS/2 power line is turned on 204. After the elapse of a suitable period of time, the PS/2 device 12 enters the "ready" state 206. Next a series of self tests are performed in the PS/2 device 12. If the "AAH" self test completion code is not received 208 after a 1500 millisecond timeout 210, a reset command is issued 212 to the PS/2 device by transmitting 314 the hex code FFH, thereafter returning to the PS/2 ready state 206. If the AAH self-test code has received, the interface 20 next checks for the 00H self test code. If the proper code is received within 4 milliseconds, the PS/2 devices should be enabled 220, and the interface 20 enables the device by transmitting 222 a F4H code to the PS/2 device 12. If the proper code is not received within 4 milliseconds, the PS/2 device 12 is reset as described above. The PS/2 device acknowledges receipt of the enable signal by transmitting a FAH code. The interface 20 awaits this signal for a period of 4 milliseconds as shown in block 22. If the acknowledge signal is not received within that interval, another reset command is issued 212 to the PS/2 device 12. If the acknowledge signal is received 224 within the 4 millisecond interval, the PS/2 device enters the idle state 228.

Returning to FIG. 6A, following initialization of hardware interfaces and firmware attributes, block 86 checks whether the interface 20 has received a control endpoint SETUP transaction from the host 16. If the interface 20 has not received, a control endpoint SETUP transaction from the host 16, control is passed to block 90. If the interface 20 has received a control endpoint SETUP transaction from the host 16, block 88 calls the PROCESS_SETUP process and upon return from that process passes control to block 90.

Block 90 checks whether the interface 20 has received a control endpoint OUT transaction from the host 16. If not, block 90 passes control to block 94. If so, block 92 calls the PROCESS_OUT_CNTL process and upon return from that process passes control to block 94. Similarly, block 94 checks whether the interface 20 has received a control endpoint IN transaction from the host 16. If not, block 94 passes control to block 98. If so, block 96 calls the PROCESS_IN_CNTL process and upon return from that process passes control to block 98.

Block 98 determines whether it is time to scan the keyboard 10 for held keys based on the configurable scan rate stored in the serial EEPROM 24. If it is not time to scan the keyboard 10 for held keys, block 98 passes control to block 102. If it is time to scan the keyboard 10 for held keys, block 100 calls the SCAN_KB process and upon return from that process passes control to block 102.

The SCAN_KB process 100 oversees the scanning of the keyboard 10 and performs debouncing functions in the present invention. Each invocation of the SCAN_KB process 100 results in one pass through the all of the rows of the keyboard 10 to scan for held keys. Debouncing determines if the same combination of keys is held for a configurable number of passes and thereby eliminates spurious keystroke indications. The number of passes required to debounce a key is hereafter referred to as the debounce count. Additional operations performed by the SCAN_KB process are described with reference to FIGS. 7, 8A, and 8B herein.

Block 102 checks whether a mouse error has occurred. If not, block 102 passes control to block 106. If so, block 104 calls the HANDLE_MOUSE_ABNORMAL process and upon return from that process passes control to block 106.

Block 106 determines whether a device address has been assigned. If not, block 106 passes control to block 80, which performs an ASIC self test. If a device address has been assigned, block 108 determines whether the mouse port has received new data. If the mouse port has not received new data, block 108 passes control to block 112 to check for a mouse endpoint stall condition. If the mouse port has received new data, block 110 calls the GET_MOUSE$_{13}$ DATA process and upon return from that process passes control to block 112.

Block 112 checks whether a mouse endpoint STALL has occurred. If so, block 112 passes control to block 122. If not, block 114 determines whether the mouse has received new data. If the mouse has received new data, block 114 passes control to block 120. If the mouse has not received three new bytes of data, block 114 passes control to block 116.

FIG. 6C is a flow chart further illustrating the steps performed to measure the data from the mouse or other PS/2 device 12. First, the PS/2 device 12 leaves the idle state 230 when it receives 232 a first byte of data. If no data is received for 50 milliseconds, a PS/2 reset command is issued 236. If data is received, it is loaded 238 in a PS/2 buffer, and the interface waits 4 milliseconds for second byte of data from the PS/2 device 12. This is depicted in block 242. If the data is not received within the 4 millisecond interval, a PS/2 reset command issued 244. If a second byte of data is received, it is loaded 246 in the PS/2 buffer, and the interface again waits 4 milliseconds for the third and last byte of data from the PS/2 device 248. When that data is received, a USB report is prepared using the three bytes of device data in the PS/2 buffer. This is depicted in blocks 256 and 254. The foregoing technique, which is especially useful in interfacing with low-bandwidth devices, essentially accepts data from the PS/2 device 12 in smaller increments at multiple intervals. This technique, the present invention reduces memory and processing requirements, and maximizes the adaptability of the interface 20 to a wide variety of devices. For example, the bit length and number of data packages accepted by the interface 20 can be user selected via programming the configuration table or configuration switches as desired.

Returning again to FIG. 6A, Block 116 checks whether the event flag MOUSE_IDLE_ELAPSE has been set. If not, block 116 passes control to block 122. If so, block 118 reloads the mouse idle timer, clears the MOUSE_IDLE_ELAPSE event flag, and passes control to block 120. Block 120 calls the HANDLE_IN_INTR(MOUSE) process to respond to any host request for mouse data, and upon return from that process passes control to block 122.

Block 122 checks whether a keyboard endpoint STALL has occurred. If so, block 122 passes control to block 84. If not, block 124 determines whether any new key has been pressed. If a new key has been pressed, block 124 passes control to block 130. If a new key has not been pressed, block 124 passes control to block 126.

Block 126 checks whether the event flag KB_IDLE_ELAPSE has been set. If not, block 126 passes control to block 84. If so, block 128 reloads the KB idle timer, clears KB_IDLE_ELAPSE, and passes control to block 130. Block 130 calls the HANDLE_IN_INTR(KB) process to respond to any host request for keyboard data, and upon return from that process passes control to block 84.

Figure 7A:
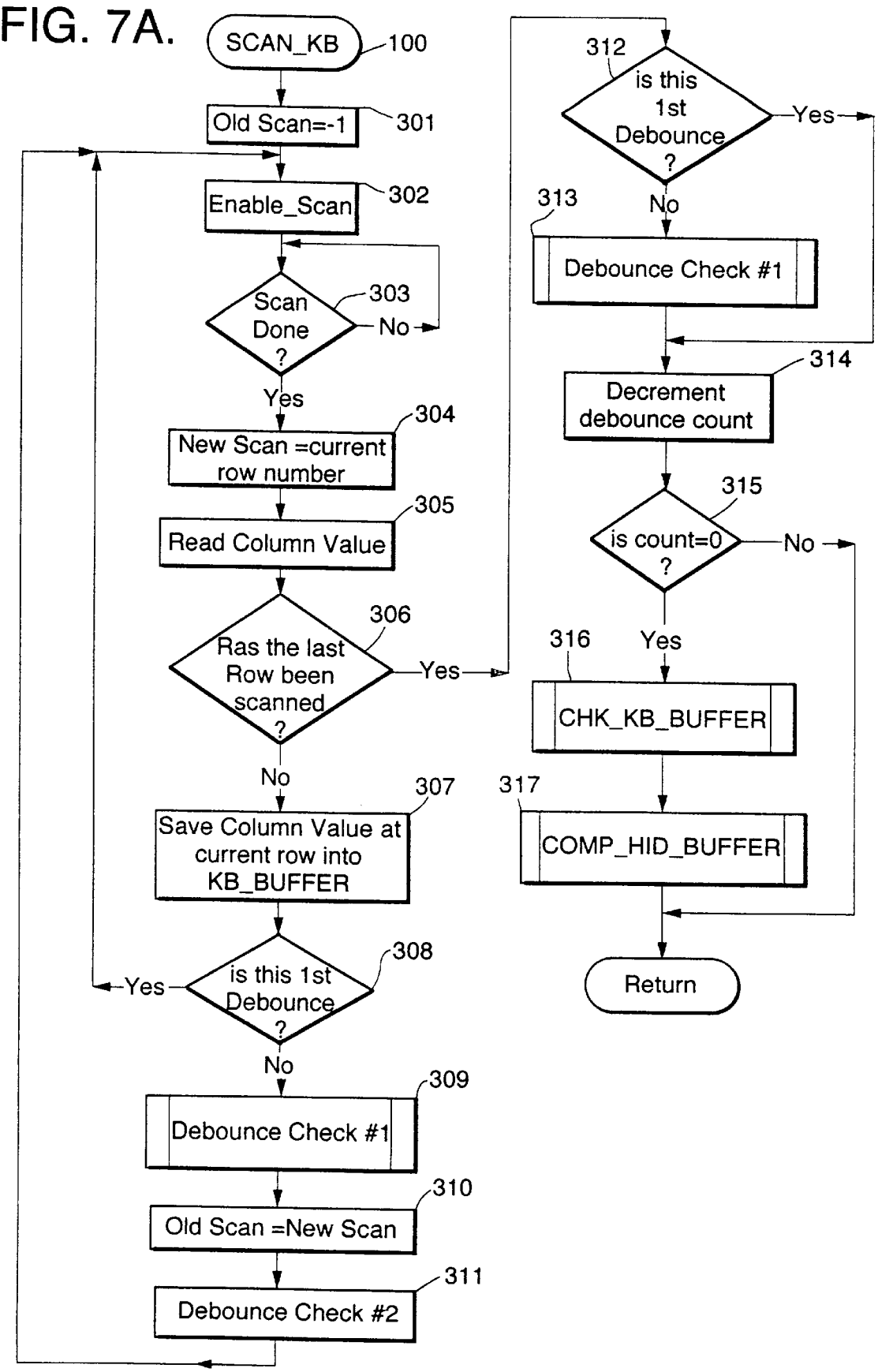
FIGS. 7A–7F are flowcharts showing the operations performed by the present invention to scan the keyboard device.

FIG. 7A is a flow chart showing the SCAN_KB process 100. This is the main process by which the firmware manages the operation of the keyboard. This process is called every time the user-defined scan period expires.

At the start of the SCAN_KB process, block 301 is called to in initialize the Old_Scan value to −1 (the purpose of initializing the Old_Scan value to −1 is to prepare the keyboard scanning process to begin at the starting row, Row 0). Block 302 enables the KB engine to start the actual KB scanning routine. Each time the KB engine scans 303 the keyboard, it will process from row Old_Scan to a row which has detected a key pressed or until it reaches row 18. Row 18 is a logical row that the firmware looks at to check for the completion of the keyboard scanning. Upon the completion of one keyboard scan, the current row number is stored 304 and its column is read 305. Then, block 306 is called to determine the status of the SCAN_KB process. If the SCAN_KB has not completed its scanning routine up to the last row, then block 307 is invoked to save the current row and column results. Next, block 308 is called to check if the scan of pressed key is a first time event. If the result is not a first time event, then block 309, (DEBOUNCE_CHECK_#1), is called to check for the stability of the pressed key(s). Block 310 updates the Old_Scan value to the current row number which will indicate the beginning of the next keyboard scan, and block 311 is invoked to compare the content of the current row with the previous row and save only the stable key events. Afterward, the KB engine is enable to begin another key scan routine. If block 308 determines that this is the first scan of the current row, then debounce check is not required and the KB_SCAN routine continues to scan its next row.

Figure 7B:
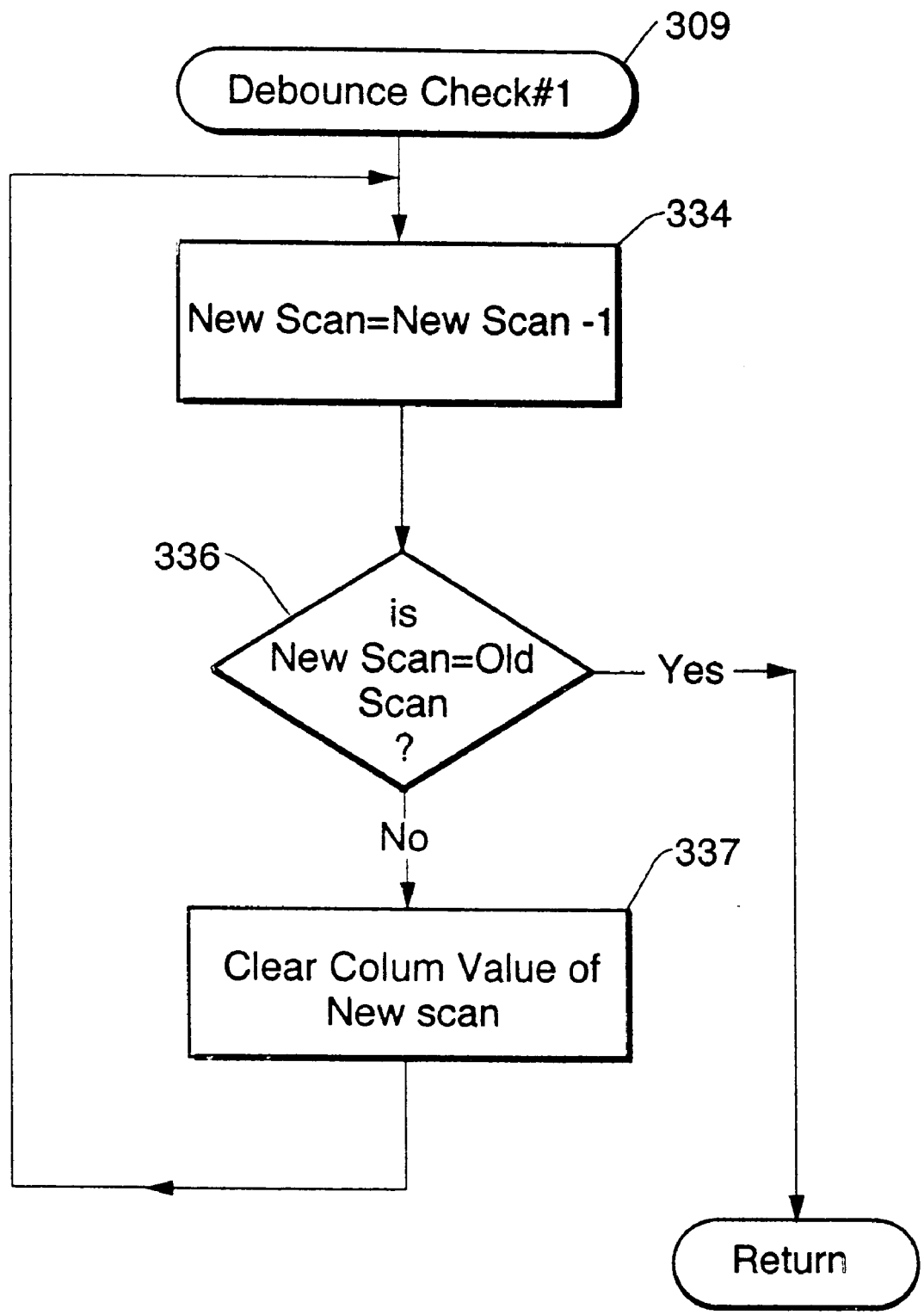

FIG. 7B is a flow chart describing the DEBOUNCE_CHCK_#1 process. In this case, the KB engine has already scanned the keyboard at least once. The firmware starts at the row prior to New_Scan as shown in block 334, and ends at row Old_Scan, clearing out any key detected before but not during this scan session. This process is illustrated in blocks 336 and 337.

Returning to FIG. 7A, once the last row has been scanned in the SCAN_KB process and the debounce checking has been completed up to the very last row, the debounce count value is decremented by one. This is illustrated in blocks 312, 313, and 314. If this count is not zero, 315 then SCAN_KB returns to the idle state of the KMP process until it is called again. If the count is zero, however, the firmware will prepare the data to be sent to the host in the following processes of CHK_KB_BUFFER 316 and COMP_HID_BUFFER 317.

Figure 7C:
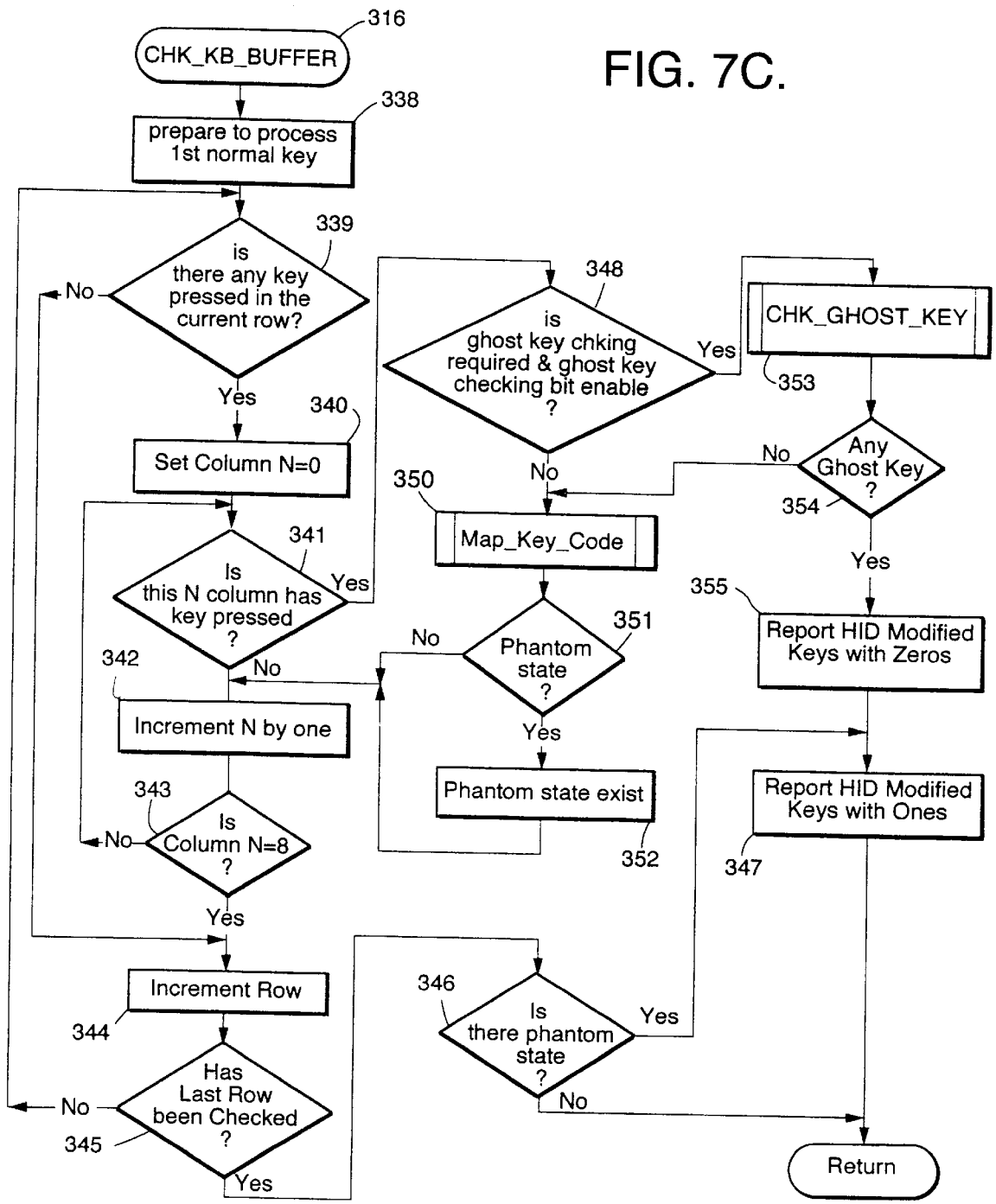

FIG. 7C shows the operations performed with respect to the CHK_KB_BUFFER process 316. The CHK_KB_BUFFER process at block 316 is called to process key pressed event. For the row with a key press detected, the firmware will check from column 0 and up to column 7 to determine the exact location of the pressed key. This is illustrated in blocks 338–343. Once the column location of the pressed key is detected, block 348 will determine if ghost key checking is required. If no ghost key checking is needed, the firmware will proceed to invoke the process MAP_

KEY_CODE in block 350. The MAP_KEY_CODE process 350, to be discussed later, returns with a determination of whether or not there is a phantom state condition in the key event. The firmware will then simply indicate whether or not there is a phantom state 351 and proceed to process the next column beginning with block 342. If ghost key checking is required, the CHK_GHOST_KEY at block 353 is called to fill the HID buffer with 0's for the modified key location and 1's for the normal key locations. A discussion of the CHK_GHOST_KEY process 353 is presented herein.

When firmware has completed its checking of the current row at all of its column locations, block 344 is called to continue the checking of the next row. Block 345 is involved to see if the firmware has reached the last row. If the firmware has checked the last row, then block 346 is called to see if a phantom state or overflow condition exists. Normally, the phantom condition is one in which there is more than six allowable normal pressed keys being detected. The number of detected lays constituting a phantom condition may be user-definable using the EEPROM 24, other memory 30, 32 or the configuration switch 55. If phantom condition exists, then the firmware will report 1's for the normal HID key buffer location 347 and then return to the SCAN_KB; otherwise, block 347 is skipped and the firmware will return to SCAN_KB 100 and call the process COMP_HID_BUFFER 317.

Figure 7D:
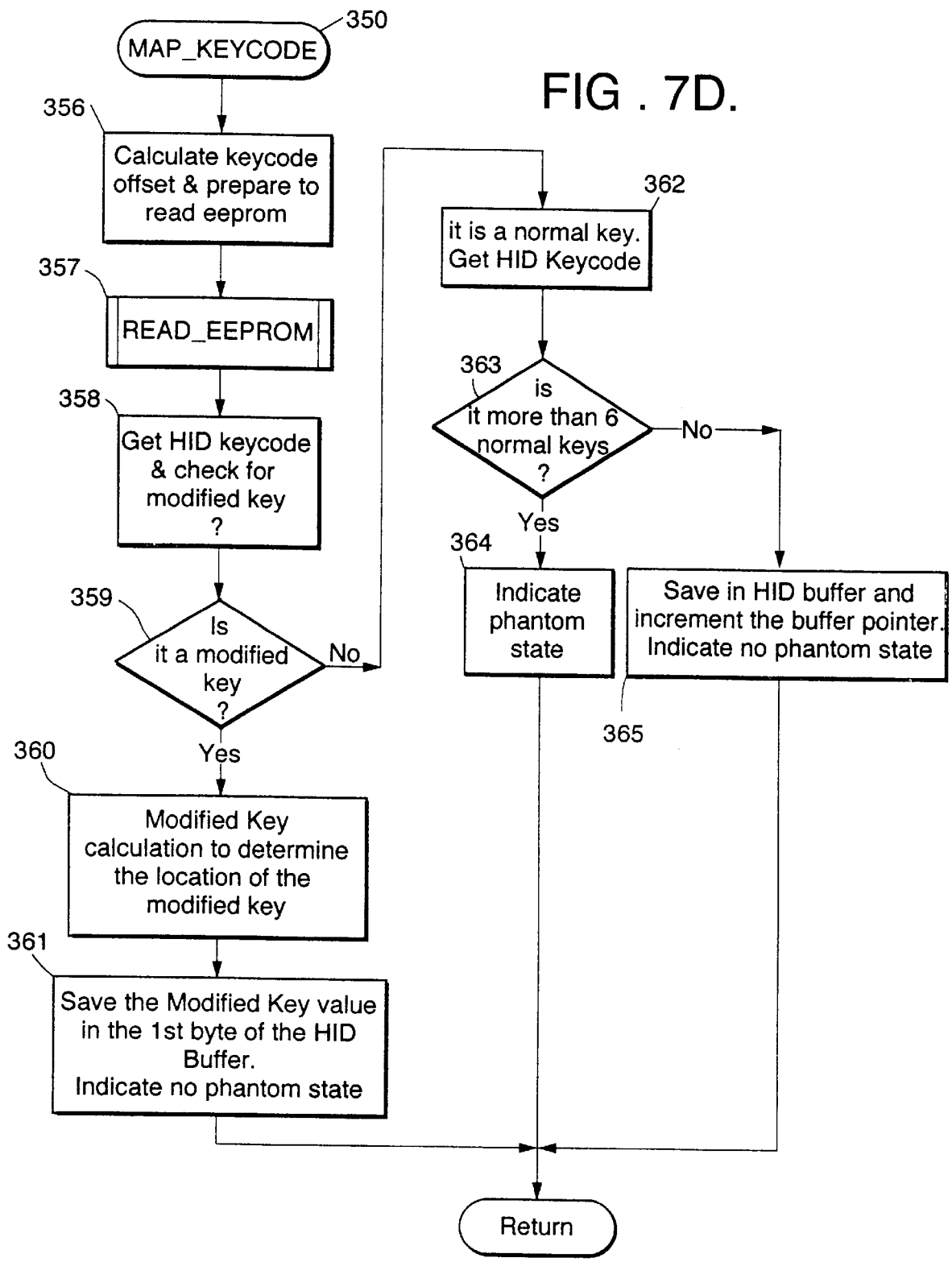

FIG. 7D shows the operations performed with respect to the MAP_KEYCODE 350 process. In the MAP_KEYCODE process 350, the firmware first calculates 356 the key code offset and then branch to another process called READ_EEPROM 357 to retrieve the actual HID key code value. Once the HID key value is obtained 358, block 359 is called to look for the presence of any modified key. If there is modified key, the firmware will calculate 360 which modified key was scanned and the result is saved 316 to the first byte of the HID Buffer. If there is no phantom state or key overflow condition, the firmware will set a flag to indicate no phantom state and return to the SCAN_KB process. On the other hand, if there is no modified key present, then the firmware will proceed to process the normal key routine. During this normal key processing, there will be checks to make sure no phantom state exists 363. If there is phantom state, block 364 is called to indicate that phantom state exists and returns the process to the SCAN_KB. If there is no phantom state, then the HID Key code is saved into byte locations 2 through 7 of the HID Buffer and then returns to the SCAN_KB process which then calls the process COMP_HID_BUFFER 317. This is shown in block 365.

Figure 7E:
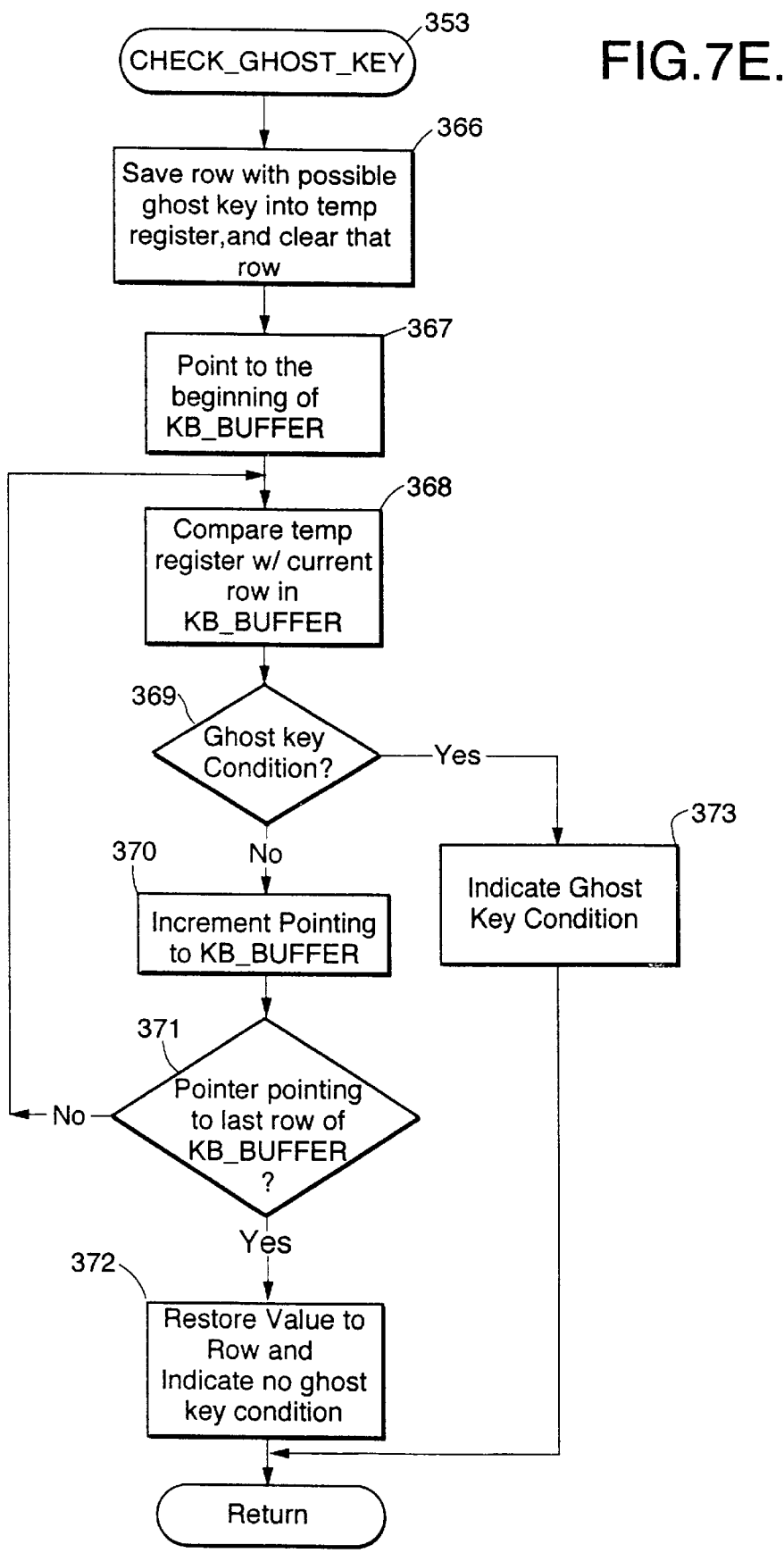

FIG. 7E illustrates the operations performed with respect to the CHECK_GHOST_KEY process 353. When the CHECK_GHOST_KEY process in block 353 is called from CHK_KB_BUFFER 316, the firmware will analyze the KB BUFFER that contains the keyboard data. In that buffer a row with at least two keys pressed will be isolated to observe for possible cause of ghost key condition. Whenever a row has at least two keys pressed and their column location matches with the column of another row's pressed key, a ghost key condition has occurred. The process of checking for ghost key condition begins with storing 366 the value of the row in question 367 in a temporary register, then the row's value is cleared from the KB BUFFER. Starting at the beginning 367 of the buffer and incrementing 370 up to the end, each row's value is compared 369 to the temporary register for ghost key condition. If there is a ghost key condition, then a flag is set to indicate 373 so and the process returns to CHK_KB_BUFFER to continue on to block 354. If no ghost key condition is found, then the value of the row in question in the KB BUFFER is restored 372, and the flag will indicate no ghost key condition before also returning to the CHK_KB_BUFFER process.

Figure 7F:
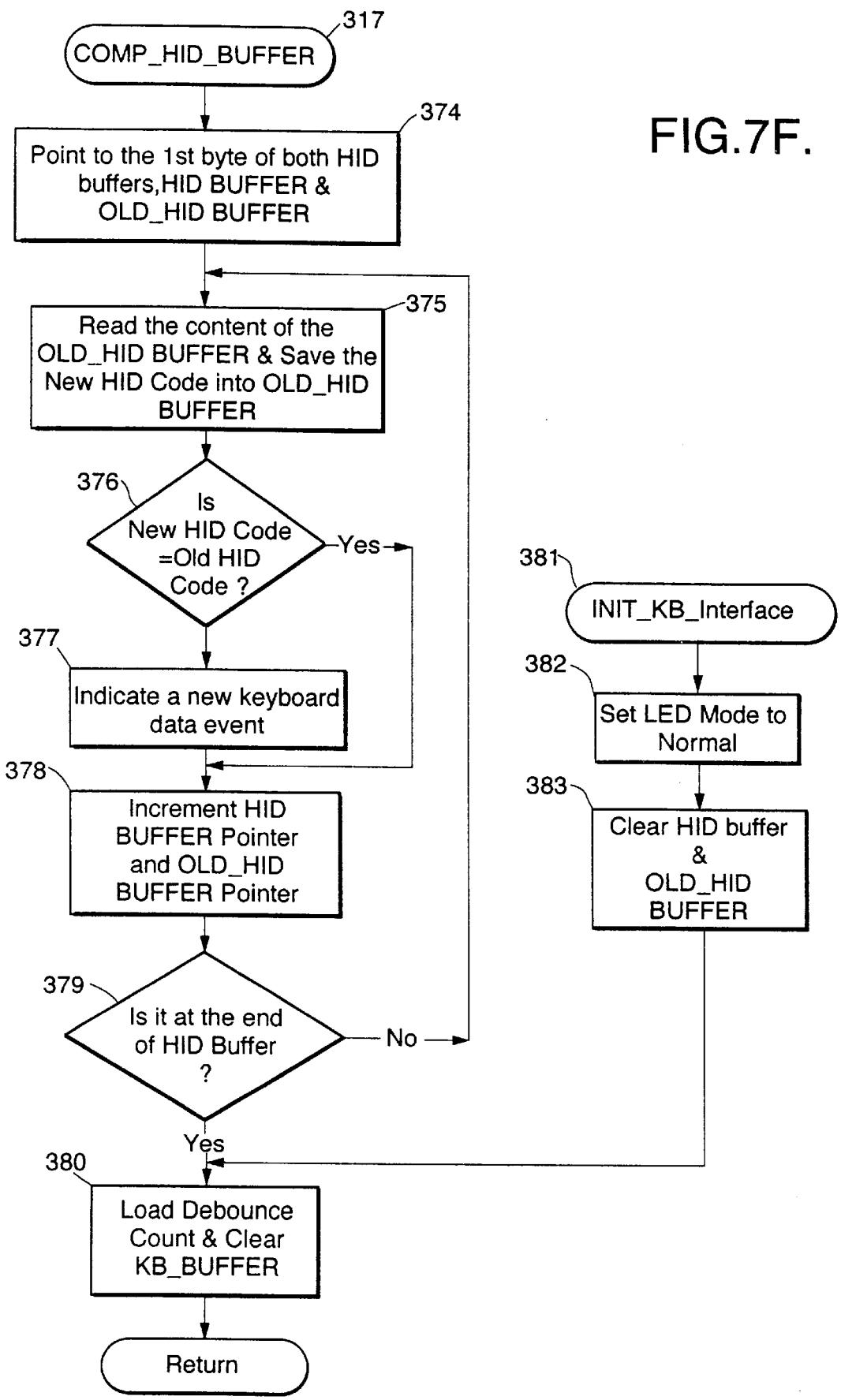

FIG. 7F illustrates the operations performed with respect to the COMP_HID_BUFFER process 317. When CHK_KB_BUFFER 316 has completed the SCAN_KB 100 process continues on to the process COMP_HID_BUFFER 317. This process basically compares the HID value from the current keyboard scan to the HID value from the previous keyboard scan to determine whether or not there are any new key events. Starting at the beginning 374 and working towards the end of the buffers, the firmware reads 375 the current HID value from the HID BUFFER and compares 376 it to the old HID value in the OLD_HID BUFFER. At the same time, the current HID values are updated 378 into the OLD_HID BUFFER, getting it ready for the next call of the COMP_HID_BUFFER 317. After the comparison is done, the Debounce count is loaded and the KB_BUFFER is cleared 380.

Figure 8:
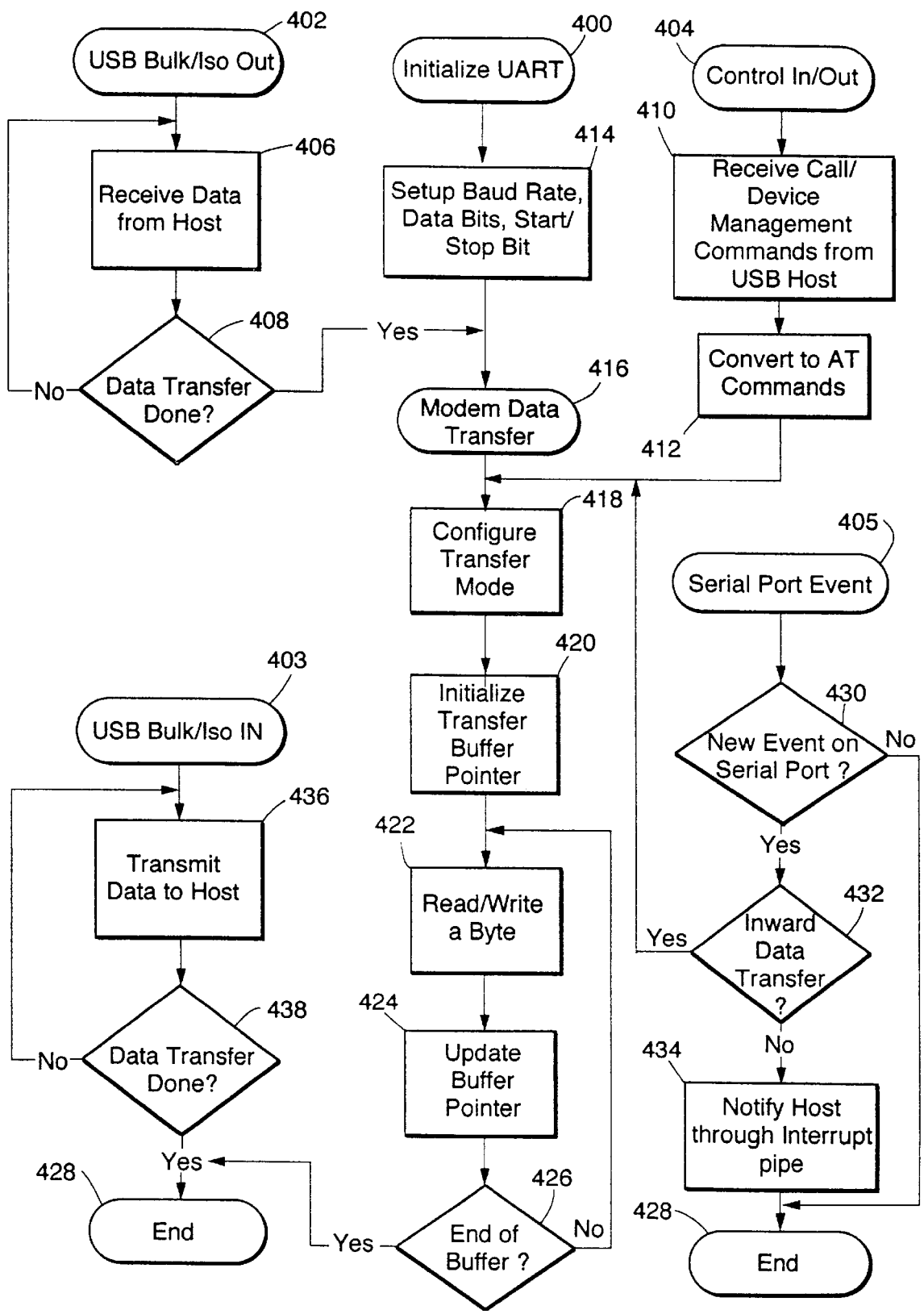
FIG. 8 is a flow chart depicting the serial interface operations for one embodiment of the present invention.

FIG. 8 is a flow chart depicting the serial interface operations performed by one embodiment of the present invention. In the illustrated example, the serial interface device is a modem. Supported functions include initializing the UART, receiving data from the host via USB port and transmitting data out to the modem via the serial interface port, and transfer them to host through USB port, receive call management commands from the USB host and convert them to AT commands and send them to the modem through the serial interface port.

After the modem has been configured in block 414 by setting up the baud rate, data bits, and start/stop bit, the interface 20 can receive call/device management commands from the USB compliant device or host, as depicted in block 410. These commands are converted into AT commands in block 412. The interface 20 sends the AT commands to the modem by configuring the transfer mode and initiating a transfer buffer pointer as depicted in blocks 418 and 420. Next, bytes of information are read or written 422 and the buffer pointer 424 is updated 424 until the end of the buffer is reached 426, thus transmitting the entire string byte by byte until the entire command string is transmitted as shown in block 428.

Whenever the USB host has data to be transferred to the modem 402, the interface 20 receives data from the host 406, through the USB port 14 until a block of data has been transferred 408. The transfer mode is then configured into a "data mode" as shown in block 418, initialize the transfer buffer pointer 420, write data byte by byte in blocks 422 424 and 426 until done 428.

When the interface detects a new event on the serial port 404 and 406, if it is a request for inward data, transfer from the modem 432, the interface receives by configuring the transfer mode 418 to "data mode," initialize the transfer buffer pointer 420, and read data byte by byte, as described above. The keyboard could also notify the USB host through an interrupt pipe, as shown in block 434 when a serial port event occurs 405.

Finally, the when the USB host requests 403, interface 20 transfers data back to the USB host through bulk in or isochronous in pipe as shown in block 403 436, and 438 until completed 428.

Figure 9:
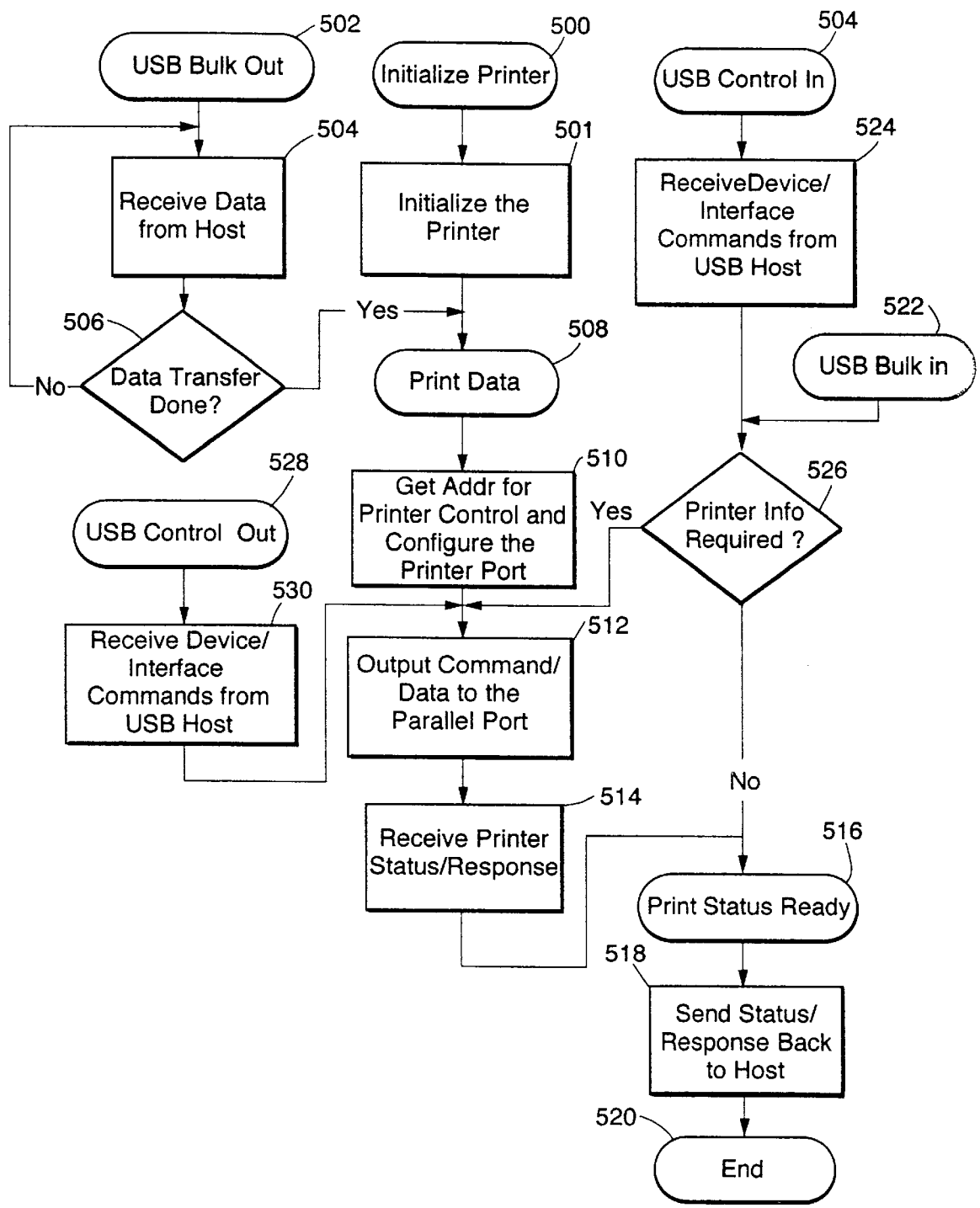
FIG. 9 is a flow chart depicting the parallel interface operations for one embodiment of the present invention.

FIG. 9 is a flowchart depicting the parallel interface operations performed in one embodiment of the present invention. The operations supported include coupling the processing unit with a parallel port, receiving data from the host through the USB, sending data to a parallel port interface device (in the example shown, the device is a printer), receiving device/interface commands from the USB host, sending those commands to the printer, and forwarding printer responses to the USB host.

After the printer has been initialized as shown in block 500, and whenever the host has data to be printed as shown in block 502, the interface 20 receives data from the host as depicted in block 504 through a USB port until a block of data has been transferred 506. The interface 20 then configures the printer port 510 and starts to output the data to the parallel port as shown in block 512. After the data transfer is completed, the printer status is sent back 514 to the interface 20 which. The interface 20 then sends the printer status back to the host in block 518 through a USB port when the host requests it as shown in block 522 or 504.

If the USB host requests any information from the printer 504, the interface 20 sends the response to the host in block 518 if it already has the printer information as shown in block 514. If the interface 20 does not have the requested updated information 526, it will send the commands to the printer as shown in block 512, receive the response as shown in block 514, and forward the information to the host as shown in blocks 516, 518, and S20.

When the USB host needs to output 528 configuration data to the printer, the interface 20 receives 530 device/interface commands from the USB host, send the command to the printer as shown in block 512, receive 130 the printer status and send the status back to the host as shown in blocks 516, 518, and 520.

Figure 10:
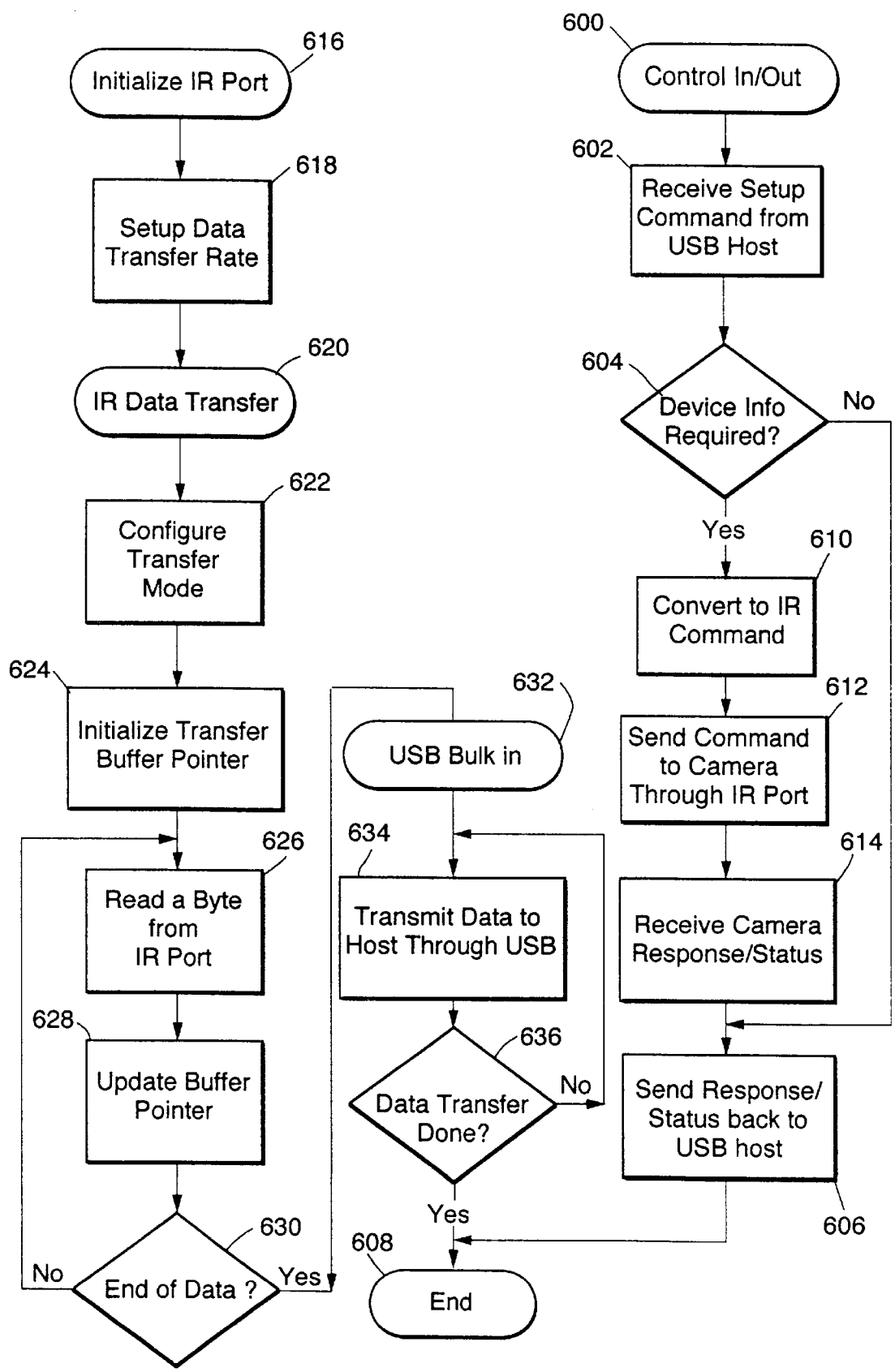
FIG. 10 is a flow chart depicting the infra-red interface operations performed in one embodiment of the present invention.

FIG. 10 is a flow chart depicting the operations performed in using the present invention with an infra-red peripheral device. In the example shown, supported operations include receiving image data from a camera through an infra-red (IR) port, transmitting data comprising the images to the USB host through the USB port, receiving setup commands from the USB host, converting the setup commands to IR energy commands of the proper protocol, and sending the IR commands to the camera.

When the USB host sends 600 a setup command, it is received 602 in the interface 20. If the interface 20 already has the camera information, block 604 routes processing to block 606, where the response is sent back to the USB host. Otherwise, the interface 20 converts 610 the command to an appropriate IR command, and sends 612 the command to the camera via the IR port. The interface 20 then receives 614 the camera's response or status, translates it if necessary (using interface configuration data) and forwards 606 it to the USB host.

After the interface 20 is initialized 616, the data transfer rate is set up 618, and the interface 20 detects 620 an event from the IR port requesting a data transfer, the port is configured 622. Next, the buffer pointer is initialized 624, and the data is read byte by byte from the IR port in blocks 626 and 628 until all of the data is read 630. Finally, the when the host requests 632, the interface 20 starts transferring 634 image data back to the host through the USB port, and continues until all of the data is transferred, as shown in blocks 636 and 608.

CONCLUSION

A low cost, highly adaptable system and method for interfacing a wide variety of input devices to a host employing the USB interface is disclosed. This interface is particularly well suited to adapt existing keyboards and mouse input devices to host computers operating with the USB protocol. The interface includes a degree of processing capability and a memory capability, allowing vendors to customize the interface to implement many interface protocols and processing schemes.

TABLE 1

| Parameter | Symbol | STD Min | STD Max | Fast Min | Fast Max | Units | Remarks |
|---|---|---|---|---|---|---|---|
| Clock Frequency | F CLK | 0 | 100 | 0 | 400 | kHz | |
| Clock high time | T HIGH | 4000 | — | 600 | — | ns | |
| Clock low time | T LOW | 4700 | — | 1300 | — | ns | |
| SDA & SCL rise time | TR | — | 1000 | — | 300 | ns | |
| SDA & SCL fall time | TF | — | 300 | — | 300 | ns | |
| START condition hold time | T HD:STA | 4700 | — | 600 | — | ns | After this period the first clock pulse is generated |
| START condition setup time | T SU:STA | 4700 | — | 600 | — | ns | Only relevant for repeated Start condition. |
| Data input hold time | T HD:DAT | 0 | — | 0 | — | ns | |
| Date input setup time | T SU:DAT | 250 | — | 100 | — | ns | |
| STOP setup time | T SU:STO | 4000 | — | 600 | — | ns | |
| Output valid from clock | TAA | — | 3500 | — | 900 | ns | |
| Bus free time | TBUF | 4700 | — | 1300 | — | ns | Time the Bus must be free before a new Xmit can start |

What is claimed is:

1. A method of adapting at least one USB-incompliant device to a USB-compliant device, comprising the steps of:
    defining a first USB endpoint for a first USB-incompliant device and a second USB endpoint in an interface in accordance with a first interface parameter set storable in a memory in the interface, the interface coupled to the USB-incompliant device and the USB compliant device;
    reading data from the first USB-incompliant device in the interface;
    preparing a device report comprising the first USB-incompliant device data; and
    providing the device report to the USB-compliant device via the first USB endpoint when a first USB-incompliant device data request is received by the control endpoint.

2. The method of claim 1 wherein the first USB endpoint is an interrupt endpoint and the second USB endpoint is a control endpoint.

3. The method of claim 1, further comprising the step of notifying the USB compliant device when a USB-incompliant device is coupled to the interface.

4. The method of claim 1, wherein the first interface parameter set includes a table for transforming USB-incompliant device data into USB-compliant device data.

5. The method of claim 1, wherein the first interface parameter set comprises a default interface parameter.

6. The method of claim 1, wherein the memory is a user-configurable nonvolatile memory.

7. The method of claim 1, wherein the interface parameter set is selectably designated by a configuration switch.

8. The method of claim 1, further comprising the steps of:
accepting a command for the first USB-incompliant device in the interface from the USB-compliant device;
translating the command into a USB-incompliant device command in accordance with the first interface parameter set; and
transmitting the USB-incompliant device command to the USB-incompliant device.

9. The method of claim 1, wherein the first USB-incompliant device is a keyboard comprising a matrix of key positions defined by intersecting row lines and column lines, and the step of reading data from the keyboard comprises the step of
sequentially pulsing the row lines while scanning the column lines for each row line that is pulsed;
suspending pulsing of the row and column lines when a key position is detected as held;
reading the row line and column line corresponding to the held key in the interface;
storing the last row line pulsed in a second memory; and
resuming pulsing the row lines from the last row line pulsed.

10. The method of claim 9, wherein the interface parameter is selected from the group comprising a keyboard scan rate, a keyboard debounce count, a keyboard key code map, and a vendor identification parameter.

11. The method of claim 9 wherein the interface parameter set comprises a keyboard keycode map and the method further comprises the step of translating the row line and column line indications into a keyboard input report using the keyboard keycode map.

12. The method of claim 9 further comprising the steps of:
comparing a plurality of successive row and column lines;
transmitting the row and column lines to the control endpoint only when successive row and column lines match.

13. The method of claim 12, wherein the interface parameter set comprises a keyboard debounce count defining a number of successive row and column numbers compared.

14. The method of claim 1, wherein the interface is further coupled to a second USB-incompliant device and the method further comprises the steps of:
defining third an USB endpoint for the second USB-incompliant device in accordance with a second set of interface parameters stored in the memory in the interface;
reading data from the second USB-incompliant device in the interface via the third USB endpoint;
preparing a device report comprising the second USB-incompliant device data; and
providing the device report to the USB-compliant device when a second USB-incompliant device data request is received by the second USB endpoint.

15. The method of claim 14, wherein the third USB endpoint is a second interrupt endpoint.

16. The method of claim 14, wherein the second USB-incompliant device comprises a PS/2 device, and the step of reading data from the second USB-incompliant device comprises the steps of:
segmenting the data from the second USB-incompliant device into data subsets; and
successively reading data subsets from the PS/2 device and storing the data subsets in a buffer memory in the interface.

17. The method of claim 14 wherein the second USB-incompliant device is a serial data transfer device.

18. The method of claim 14 wherein the second USB-incompliant device is a parallel data transfer device.

19. The method of claim 14 wherein the second USB-incompliant device is an infrared data transfer device.

20. A method of communicating data between at least one USB-compliant device and a first USB-incompliant device comprising the steps of:
sending a message requesting a device report from an interface coupled to a first USB-compliant device and the USB-incompliant device, the interface defining a first USB endpoint and a second USB endpoint for the first USB-incompliant device in accordance with a first interface parameter set stored in a memory; and
receiving the device report from the interface, via the first interrupt endpoint, wherein the device report is prepared by performing the steps of reading data from the first USB-incompliant device in the interface.

21. The method of claim 20, further comprising the step of receiving a message indicating that a USB-incompliant device is coupled to the interface.

22. The method of claim 20, further comprising the step of sending a message to the interface to command the first USB-incompliant device, the message translated into a USB-incompliant device command in the interface in accordance with the first interface parameter set.

23. A method of adapting a USB-incompliant device to a USB-compliant device, comprising the steps of:
reading a command from the USB-compliant device in an interface coupled to the USB compliant device and the USB-incompliant device, the interface defining a first USB endpoint communicatively coupled to a second USB endpoint;
transforming the command to a USB-incompliant device command in accordance with an interface parameter set stored in a memory in the interface; and
transmitting the transformed command to the USB-incompliant device.

24. The method of claim 23 wherein the first USB endpoint is a control endpoint and the second USB endpoint is an interrupt endpoint.

25. An apparatus for adapting at least one USB-incompliant device to a USB-compliant device, comprising:
means for defining a first USB endpoint for a first USB-incompliant device and a second USB endpoint in accordance with a first interface parameter set stored in a memory accessible by the interrupt endpoint;
means for reading data from the first USB-incompliant device;
means for preparing a device report comprising the first USB-incompliant device data; and
means for providing the device report to the USB-compliant device when a first USB-incompliant device data request is received by the second endpoint.

26. The apparatus of claim 25 wherein the first USB endpoint is an interrupt endpoint and the second USB endpoint is a control endpoint.

27. The apparatus of claim 26, further comprising means for notifying the USB-compliant device when an interrupt endpoint for a first USB-incompliant device is defined.

28. The apparatus of claim 25, wherein the first interface parameter set includes a table for transforming USB-incompliant device data into USB compliant device data.

29. The apparatus of claim 25, wherein the memory is a user-configurable non-volatile memory.

30. The apparatus of claim 25, wherein the interface parameter set is selectably designated by a configuration switch.

31. The apparatus of claim 25, further comprising:
means for accepting a command for the first USB-incompliant device from the USB-compliant device;
means for translating the command into a USB-incompliant device command in accordance with the first parameter set; and
means for transmitting the USB-incompliant device command to the USB-incompliant device.

32. The apparatus of claim 26, wherein the first USB-incompliant device is a keyboard comprising a matrix of key positions defined by intersecting row lines and column lines, and the means for reading data from the keyboard comprises:
means for sequentially pulsing the row lines while scanning down the column lines for each row line that is pulsed;
means for suspending pulsing of the row and column lines when a key position is detected as held;
means for reading the row line and column line corresponding to the held key;
means for storing the last row line pulsed; and
means for resuming pulsing the row lines from the last row line pulsed.

33. The apparatus of claim 32, further comprising means for translating the row and column lines into a keyboard input report using a keyboard keycode map stored in the memory.

34. The apparatus of claim 32, further comprising:
means for comparing a plurality of successive row and column lines; and
means for transmitting the row and column lines to the control endpoint only when the successive row and column lines match.

35. The apparatus of claim 34, wherein the interface parameter set comprises a keyboard debounce count defining a number of successive row and column numbers compared.

36. An apparatus for adapting at least one USB-incompliant device with a USB-compliant device, comprising:
a legacy device interface module, communicatively coupled to the first USB-incompliant device, the legacy device interface module defining a first USB endpoint for the first USB-incompliant device, the legacy device interface for obtaining data from the first USB-incompliant device and for generating a report comprising USB-incompliant device data;
a host interface module, in an interface coupled to the USB-compliant device and the legacy device interface module, the host interface module defining a second endpoint, the host interface module for generating a USB-compliant data report comprising USB-incompliant device data; and
a user-configurable memory coupled to the legacy device interface module and the host interface module, for storing interface parameters for the first USB endpoint and the second endpoint and for generating the USB data report.

37. The apparatus of claim 36, wherein the first USB endpoint is an interrupt endpoint and the second USB endpoint is a control endpoint.

38. An interface device, comprising:
a processor, communicatively coupleable to a user-configurable memory via a user-configurable memory interface, and a USB-compliant device via a USB transceiver, wherein the-user configurable memory comprises a configuration table storing data defining interface parameters for the USB-compliant device and a USB-incompliant device;
a keyboard scanner, communicatively coupled to the processor and communicatively coupleable to a keyboard comprising a matrix of key positions defined by intersecting row lines and column lines, the keyboard scanner for sequentially pulsing the row lines while scanning the column lines for each row line that is pulsed; and
wherein the processor comprises means for generating a USB report comprising data from the keyboard.

39. The interface of claim 38, further comprising a peripheral device scanner, comprising a peripheral device transceiver communicatively coupleable to a USB-incompliant peripheral device and a peripheral device engine for providing communications between the processor and the peripheral device transceiver.

40. The interface device of claim 38, further comprising a configuration switch interface, coupled to the processor, for selectably designating interface parameters.

41. A system for enabling peripheral units which may have widely different operating characteristics, including but not limited to data rate, synchronicity, data format, directionality, and mode of operation, to be coupled without modification to a universal serial bus host which requires prescribed data prescriptors and presented data formats, but without requiring changes in the host for different peripheral unit configurations, comprising:
a data management unit including an internally clocked microprocessor having data storage circuits and coupled to receive data in the form and at times provided by the different peripheral units, and having assembler circuit coupled to provide universal serial bus message frames to the host on demand;
an electronically-changeable data adaptation unit including circuits for storing particularized configuration data as to peripheral unit properties, including data prescriptors, data formats, and interchange protocols, and coupled to control both the timing of transfer and the transformation of received data into universal serial bus format in the data management unit, whereby different peripheral units can be coupled to function with the host by changing only the data adaptation unit.

42. The system of claim 41 above, wherein the data adaptation unit comprises an electronically erasable programmable read only memory.

43. The system of claim 42 above, wherein the host operates an active command bus structured to control endpoints representing slots for different peripheral units, and wherein the system is arranged to function as a control endpoint, with different interrupt endpoints for the different peripheral units.

44. The system of claim 41 above, wherein the peripheral unit is a keyboard comprising a matrix of key positions defined by intersecting row lines and column lines, and the data management device comprises means for reading data from the keyboard, comprising:

means for sequentially pulsing the row lines while scanning down the column lines for each row line that is pulsed;

means for suspending pulsing of the row and column lines when a key position is detected as held;

means for reading the row line and column line corresponding to the held key; and means for resuming pulsing the row lines from the last row line pulsed.

45. The system of claim 44 above, further comprising:

means for comparing a plurality of successive row and column lines;

means for transmitting the row and column lines to the control endpoint only when the successive row and column lines match; and wherein the data adaptation unit stores data defining the number of successive row and column numbers compared.

* * * * *